(12) United States Patent
Cronie

(10) Patent No.: US 9,710,330 B2
(45) Date of Patent: Jul. 18, 2017

(54) PARTIAL CLOUD DATA STORAGE

(71) Applicant: Empire Technology Development LLC, Wilmington, DE (US)

(72) Inventor: Harm Stefan Cronie, Poliez-le-Grand (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 146 days.

(21) Appl. No.: 14/515,214

(22) Filed: Oct. 15, 2014

(65) Prior Publication Data

US 2016/0110254 A1   Apr. 21, 2016

(51) Int. Cl.
*G06F 11/10* (2006.01)
*H04L 29/08* (2006.01)

(52) U.S. Cl.
CPC ...... *G06F 11/1076* (2013.01); *H04L 67/1097* (2013.01); *G06F 2211/1028* (2013.01)

(58) Field of Classification Search
CPC .................... G06F 11/1076; H04L 67/1097
See application file for complete search history.

(56) References Cited

U.S. PATENT DOCUMENTS

| | | | |
|---|---|---|---|
| 8,392,805 B2 | 3/2013 | Wylie et al. | |
| 8,458,287 B2 | 6/2013 | Ozzie et al. | |
| 8,560,639 B2 * | 10/2013 | Murphy | G06F 11/1446 707/610 |
| 8,892,598 B2 * | 11/2014 | Motwani | H04L 63/06 707/770 |
| 2011/0289351 A1 * | 11/2011 | Rashmi | G06F 11/1662 714/6.32 |
| 2013/0054549 A1 | 2/2013 | Gopalan et al. | |
| 2013/0173916 A1 | 7/2013 | Sato | |
| 2013/0290361 A1 * | 10/2013 | Anderson | H04L 67/10 707/758 |

(Continued)

OTHER PUBLICATIONS

Dimakis, A.G., et al, "Decentralized Erasure Codes for Distributed Networked Storage" IEEE/ACM Transactions on Networking (TON)—Special issue on networking and information theory, vol. 14, Issue SI, pp. 2809-2816 (Jun. 2006).

(Continued)

*Primary Examiner* — April Y Blair
*Assistant Examiner* — Rong Tang
(74) *Attorney, Agent, or Firm* — Amin, Turocy & Watson, LLP

(57) ABSTRACT

Technologies are generally described for partial cloud data storage. In one example, a method includes dividing, by a system comprising a processor, a file into a set of source packets in response to an indication that the file is to be stored in a data store of a network device. The method also includes transforming the set of source packets into a set of encoded packets by encoding the set of packets into codeword symbols of an error correcting code. Further, the method includes facilitating storage of a first portion of the set of encoded packets to the data store of the network device and a second portion of the set of encoded packets to one or more user devices. A first number of packets in the first portion is more than a second number of packets in the second portion and the second portion is at least used to decode the file.

20 Claims, 15 Drawing Sheets

(56) References Cited

U.S. PATENT DOCUMENTS

2015/0281193 A1* 10/2015 Zheng ............... H04L 9/085
    713/171
2015/0293896 A1* 10/2015 Runkis ............. G06F 9/45533
    707/755

OTHER PUBLICATIONS

Cooley, J. A., et al., "Software-based Erasure Codes for Scalable Distributed Storage," 20th IEEE/11th NASA Goddard Conference on Mass Storage Systems and Technologies, pp. 157-164 (Apr. 2003).

Didier, F., "Efficient erasure decoding of Reed-Solomon codes," arXiv:0901.1886v1 [cs.IT], Jan. 14, 2009, published online at [http://arxiv.org/pdf/0901.1886.pdf], 4 pages.

Rabin, M., "Efficient dispersal of information for security, load balancing and fault tolerance," Journal of the ACM, vol. 36, No. 2, pp. 335-348 (Apr. 1989).

Shokrollahi, A., "Raptor Codes," IEEE Transactions on Information Theory, vol. 52, No. 6, pp. 2551-2567 (Jun. 2006).

\* cited by examiner

PARTIAL CLOUD DATA STORAGE

TECHNICAL FIELD

The subject disclosure relates generally to data storage and, also generally, to partial cloud data storage.

BACKGROUND

With advancements in computing technology and prevalence of computing devices, usage of computers for daily activities has become commonplace. Cloud storage enables data to be stored on remote storage media over a network. This remote storage provides users storage capabilities without requiring local storage for their data. Further, with cloud storage, users may access the data easily over a network connection (e.g., over an Internet connection) and from any device.

Since some of the data stored on a cloud storage device may be confidential and/or private, one concern related to cloud storage is security of the data and trustworthiness of a cloud storage provider. Further, use of encryption of a single cloud storage provider may result in problems when the provider is hacked, there are rogue employees at the provider, the user looses the key or has a weak password, and so on. Even though encryption itself might not be broken, security is still at risk.

SUMMARY

In one embodiment, a method may include dividing, by a system comprising a processor, a file into a set of source packets in response to an indication that the file is to be stored in a data store of a network device. The method may also include transforming the set of source packets into a set of encoded packets. Further, the method may include facilitating storage of a first portion of the set of encoded packets to the data store of the network device and a second portion of the set of encoded packets to one or more user devices. A first number of packets in the first portion may be more than a second number of packets in the second portion. Further, the second portion may be at least used to decode the file.

According to another embodiment, a system may include a memory storing computer-executable components and a processor, coupled to the memory, operable to execute or facilitate execution of one or more of the computer-executable components. The computer-executable components may include a file manager that may be configured to divide a file into a first set of source packets and generate a block of metadata. The computer-executable components may also include a packet manager that may be configured to encode the first set of packets and produce a second set of packets. A quantity of the second set of packets may be determined based on a number of data stores into which the second set of packets are to be stored. Further, the computer-executable components may include a distribution manager that may be configured to transmit a first portion of the second set of packets to one or more data stores associated with one or more network devices, and a second portion of the second set of packets to a user device. The file may be reassembled using the second portion and at least a subset of the first portion.

According to another embodiment, provided is a computer-readable storage device comprising executable instructions that, in response to execution, cause a system comprising a processor to perform operations. The operations may include obtaining a first set of packets from one or more network devices and obtaining a second set of packets from one or more selected user devices. Further, the operations may include generating a set of decoded packets based on the first set of packets and the second set of packets and reconstructing a file based on the decoding. The operations may also include reconstructing a file based on generating the set of decoded packets. The obtaining the second set of packets may comprise obtaining less than a total amount of the first set of packets from the one or more network devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

DETAILED DESCRIPTION

Overview

Figure 1:
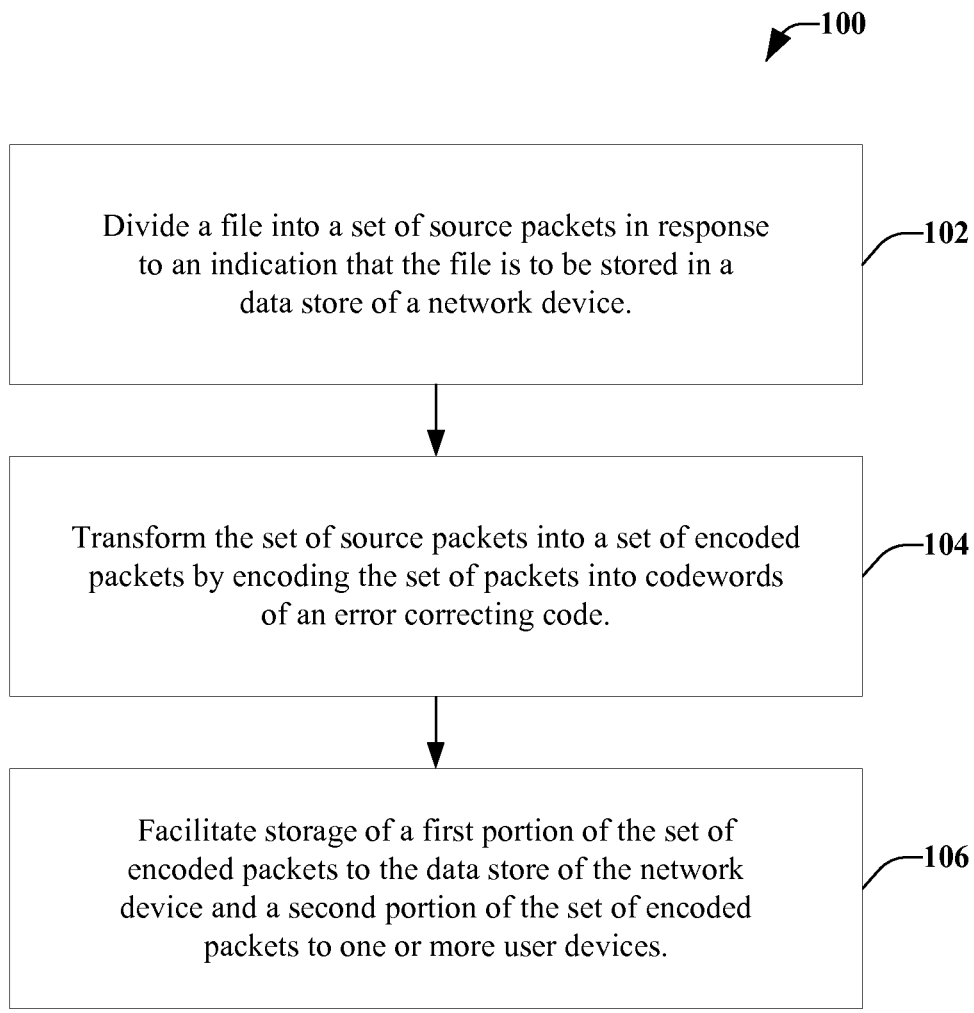
FIG. 1 illustrates an example, non-limiting embodiment of a method for storing data on multiple devices for cloud storage of the data.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, may be arranged, substituted, combined, separated, and designed in a wide variety of different configurations, all of which are explicitly contemplated herein.

As provided herein, various aspects relate to partitioning a file into packets and storing the packets at least two sets of nodes. For example, a first set of nodes may be network nodes associated with one or more network storage providers and a second set of nodes may be user devices (e.g., devices controlled by a user, or trusted by a user). The packets may be stored such that the first set of nodes stores most of the data, however, at least a portion of the packets stored on the second set of nodes is necessary to reconstruct the data. Further, the use of the first set of nodes and the second set of nodes may be configured to enforce location-based access restriction, according to an aspect. For example, one or more of the second set of nodes might be utilized to reconstruct the data only while the nodes are located within a defined geographic area.

The disclosed aspects enable user devices (including mobile devices) to store data in the cloud in a secure manner. For example, the breach of one or more cloud repositories or user devices does not compromise the security of the data. However, the data may still be recovered if access is lost to one or more of the cloud storage providers, or if one or more the user devices are lost or compromised.

The various aspects disclosed herein may facilitate storage of the packets based on erasure codes. Erasure codes may be a type of (forward) error-correction coding. According to an aspect, a file is divided into pieces, referred to as source packets. Each of the source packets is interpreted as a source symbol of an erasure code or error-correcting code. A set of k source packets (source symbols) is encoded to lead to a codeword consisting of n codeword symbols, where k and n are integers. Each of the n codeword symbols is in turn a packet and may be referred to as an encoded packet.

Thus, the erasure codes may provide redundancy by dividing a file (e.g., an original file, a revised file, a resaved file, and so on) into a set of encoded packets and storing the encoded packets in different data stores (e.g., on a first set of devices, on a second set of devices, and so on). Further, using an erasure code provides that from the k source packets that constitute the original file, n>k packets may be generated, which are all unique. The erasure code has the property that the original file may then be reconstructed from any k encoded packets out of the n encoded packets. This, in turn, enables a user the ability to store data on multiple cloud storage providers and/or multiple user devices while being able to reconstruct only with a subset of the storage providers and/or user devices. Furthermore, each of the storage providers stores less than k encoded packets such that the data of the provider alone may not be enough to reconstruct the original file, thereby rendering the encoded packets stored at the individual data stores useless without additional encoded packets stored at other data stores and/or user devices.

According to an implementation of partial cloud storage as discussed herein, k is larger than a number of nodes associated with one or more cloud storage providers that are used to store the data (e.g., the encoded packets). Further, the total number of codeword symbols n may be chosen such that the complete file may be reconstructed from any k+e of the encoded packets, where e is a small integer, but the number of codeword symbols L stored in the cloud is less than k+e, where L is an integer and is less than k. For example, the small integer may be equal to 0 for maximum distance separable (MDS) codes. An example of an MDS code is the Reed-Solomon code.

A determined number of nodes (e.g., network devices, data stores, and so on) associated with one or more cloud storage providers may be used to store a set of codeword symbols (e.g., a set of encoded packets) and a determined number of user devices may be used to store another set of codeword symbols (e.g., another set of encoded packets). The determination of the number of nodes may be based on the number of cloud storage providers selected by a user. For example, the user might select a single cloud storage provider for storage of her data. However, according to other examples, the user might select more than one cloud storage provider for storage of her data. Each cloud storage service provider may have a number of nodes or devices (e.g., data stores) on which the encoded packets are distributed, wherein the encoded packets comprise the codeword symbols. Further, the user may elect to store the other set of codeword symbols on one or more cloud storage service providers and/or one or more user devices. For example, if the user has five devices, the user might select any number of the five devices on which to store the other set of codeword symbols. In another example, the user might select two or more cloud storage service providers on which to store their data. In cases where the data is dispersed across several independent cloud storage providers, there should be sufficient cooperation and infrastructure between the cloud storage providers.

By storing a set of codeword symbols on the nodes associated with the one or more cloud storage providers and another set of codeword symbols on the one or more user devices, no portion of the message or file may be recovered using only the set of codeword symbols stored on the cloud providers or only the other set of codeword symbols stored on the user devices. Thus, at least a portion of the set of codeword symbols and at least a portion of the other set of codeword symbols are needed to reconstruct the file.

Dispersing the data across multiple devices and/or storage nodes of cloud storage providers may increase security. However, when data is dispersed among multiple independent cloud storage providers, the dispersed data might still be subject to malicious activity if access to the several independent cloud storage providers is achieved, allowing for recovery of the data by a rogue user or entity. Further, a user may not want to perform simple copying of the parts of the file, but still wants to enable recovery if only part of the devices/storage nodes are available. Furthermore, there are minimal storage requirements at the user devices. Increased security, recovery of the file, and minimal storage needs at the user devices are enabled, as discussed herein, by the use of erasure codes or error-correcting codes. Security is increased since multiple devices and/or multiple cloud storage providers need to supply data to make recovery possible.

According to an implementation, the set of user devices may be under control of a single user. In accordance with another implementation, the set of user devices may be under control of a group of users that have permission to access the data, and all the user devices are coupled to a network (e.g., a local access network).

As discussed herein, a file is divided into packets (which are referred to as source packets), in which each source packet may be equally sized portions, about the same size, or different sizes. Further, the source packets may contain the necessary information to reassemble the file, such as in the packet headers or in another location.

According to an implementation, the file may not be reconstructed using only codeword symbols stored in the cloud, however, the code rate may be determined so that a large portion of the data is stored in the cloud. The code rate r=k/n, or information rate, refers to the proportion of the data-stream that is useful (or non-redundant). In this manner, some of the n-L codeword symbols stored on the user devices are necessary to reconstruct the data. However, the amount of data stored on the user device storage is minimized, as a larger portion of the data is stored in the cloud, as discussed further herein. According to an implementation, a user may determine how the data stored on the user devices is divided among the devices. However, according to other implementations, the determination of how to store the data on the user devices may be automatically determined, for example, by the system.

When there are multiple users, the division of the data stored on the user devices may be chosen such that any of the codeword symbols stored on each user's device may be sufficient to reconstruct the data when combined with at least a portion of the codeword symbols stored in the cloud. In an alternative implementation, the codeword symbols may be apportioned so that no single user may reconstruct the data without the cooperation of some (or all) of the other users. Further embodiments discussed herein include geographic grouping of users so that nearby users may reconstruct encoded data, or so given users only may reconstruct data in a particular location, such as a workplace.

As an example implementation, sensitive patient data may be encoded at a hospital so that the bulk of the encoded data is retained at the hospital's cloud and some of the encoded data is stored on mobile devices assigned to doctors and/or patients. Thus, only the doctors and/or the patients may reconstruct the records from the data stored at the hospital, and may only do so in communication with the hospital's cloud (access to which may be geographically restricted.)

In an embodiment, a method is described herein that may include dividing, by a system comprising a processor, a file into a set of source packets in response to an indication that the file is to be stored in a data store of a network device. The method may also include transforming the set of source packets into a set of encoded packets. Further, the method may include facilitating storage of a first portion of the set of encoded packets to the data store of the network device and a second portion of the set of encoded packets to one or more user devices. A first number of packets in the first portion may be more than a second number of packets in the second portion. Further, the second portion may be at least used to decode the file.

In one example, dividing the file into the set of packets may include dividing the file into packets comprising a same length and appending a packet of the set of packets with a sequence of symbols designated as a filler symbol.

According to another example, the set of encoded packets may be determined to be stored in data stores of two or more network devices. Further to this example, dividing the file into the set of source packets may include dividing the file into more source packets than a number of data stores into which the first portion is stored.

In accordance with another example, facilitating the storage of the second portion may include facilitating storage of a first set of the second portion on a first user device and a second set of the second portion on a second user device. Further to this example, the first user device and the second user device may be associated devices.

According to a further example, transforming the set of source packets may include determining a quantity of packets for the set of encoded packets. Further to this example, the file may be reassembled from at least the second portion and at least a subset of the first portion.

According to yet other example, facilitating the storage of the second portion may include facilitating storage of the second portion based on a determination that the one or more user devices are located within a defined geographic area.

According to some examples, the packets of the set of packets may comprise respective headers that comprise respective information configured to be utilized to reassemble the file. Further to this example, dividing the file into the set of packets may comprise including, in each header of the respective headers, a packet number and a field that indicate a number of bytes in the file.

In accordance with another example, facilitating the storage of the set of encoded packets may include facilitating storage of a first set of the second portion to a first user device and a second set of the second portion to a second user device. The first user device and the second user device may be determined to be located in a defined geographic area during the storage. Further to this example, the first set and the second set may be both configured to be used to reassemble the file.

According to another example, encoding the set of packets may include encoding the set of packets wherein packets of the set of packets are not included in the packets of the set of encoded packets.

According to another embodiment, a system is described herein that includes a memory storing computer-executable components and a processor, coupled to the memory. The processor may be operable to execute or facilitate execution of one or more of the computer-executable components. The computer-executable components may include a file manager that may be configured to divide a file into a first set of source packets and generate a block of metadata. The computer-executable components may also include a packet manager configured to encode the first set of packets and produce a second set of packets. A quantity of the second set of packets may be determined based on a number of data stores into which the second set of packets are to be stored. Further, the computer-executable components may include a distribution manager configured to transmit a first portion of the second set of packets to one or more data stores associated with one or more network devices, and a second portion of the second set of packets to a user device. The file may be reassembled using the second portion and at least a subset of the first portion.

In an example, the computer-executable components may include a selection component configured to determine the user device and another user device for storage of the second portion of the second set of packets. Further to this example, the distribution manager may transmit a first subset of the second portion to the user device and a second subset of the second portion to the other user device. The user device and the other user device may be associated devices.

In accordance with another example, the computer-executable components may include a selection component that may be configured to determine the user device based on a geographic restriction determined to be present between the user device and the one or more data stores associated with the one or more network devices.

According to another example, the computer-executable components may include a selection component configured to determine the user device and another user device for storage of the second portion of the second set of packets based on respective locations of the user device and the other user device during the storage of the second portion. Further to this example, the distribution manager may transmit a first subset of the second portion to the user device and a second subset of the second portion to the other user device. The first subset and the second subset may be both used to reconstruct the file.

In accordance with a further example, the distribution manager may be further configured to transmit a first subset of the first portion to a first network device of the one or more network devices and a second subset of the first portion to a second network device of the one or more network devices. The first network device and the second network device may be controlled by different network provider devices associated with different network service provider identities.

According to another example, the distribution manager may be further configured to transmit the second portion of the second set of packets to the user device that is determined to be located in a defined geographic area as the one or more network devices In accordance with another embodiment, described herein is a computer-readable storage device that includes executable instructions that, in response to execution, may cause a system comprising a processor to perform operations. The operations may include obtaining a first set of packets from one or more network devices and obtaining a second set of packets from one or more selected user devices. The operations may also include generating a set of decoded packets based on the first set of packets and the second set of packets and reconstructing a file based on generating the set of decoded packets. Obtaining the second set of packets may include obtaining less than a total amount of the first set of packets from the one or more network devices.

In accordance with an example, the operations may further include determining the one or more selected user devices based on a proximity of the one or more selected user devices to the one or more network devices.

According to another example, the operations may further include determining the one or more selected user devices based on respective data transfer capabilities.

According to still another example, the operations may also include determining an error correcting code used to encode the first set of packets and the second set of packets. Further to this example, output symbols of the first set of packets and the second set of packets might not include input symbols of the file.

In accordance with another example, the operations may include determining an erasure code used to encode the first set of packets and the second set of packets. Further to this example, output symbols of the first set of packets and the second set of packets might not include input symbols of the file.

Herein, an overview of some of the embodiments for providing partial cloud data storage with error-correcting codes has been presented above. As a roadmap for what follows next, various example, non-limiting embodiments and features for an implementation of partial cloud data storage are described in more detail. Then, a non-limiting implementation is given for a computing environment in which such embodiments and/or features may be implemented.

Partial Cloud Data Storage

As disclosed herein, partial cloud data storage is provided. One problem with cloud storage may be the security of data in a cloud storage environment. According to various aspects disclosed herein, a large fraction (e.g., about 99.9%, about 99.5%, and so on) of the data may be stored in the cloud storage. The remainder of the data may be stored on one or multiple devices owned by (or associated with) a user. The data may be recovered by downloading the data from the cloud and augmenting the downloaded data with at least some of the data stored on the user devices. Therefore, although the cloud storage holds most of the data, the user data cannot be recovered from the data stored in the cloud alone. Further, the disclosed aspects may be configured such that the data may be accessed with some of the user devices that contain the remainder of the data (e.g., not all the user devices are necessary to recover the file). In addition, the disclosed aspects may be implemented using erasure codes and/or error correcting codes. For example, if the code used has dimension d and only information about less than d dimensions is known, there is an ambiguity on the values of the other dimensions.

With respect to one or more non-limiting ways to manage partial cloud data storage, FIG. 1 illustrates an example, non-limiting embodiment of a method 100 for storing data on multiple devices for cloud storage of the data. The method 100 in FIG. 1 may be implemented using, for example, any of the systems, such as a system 300 (of FIG. 3), described herein below. Beginning at block 102, divide a file into a set of source packets responsive to an indication that the file is to be stored in a data store of a network device. The indication may be a request by a user to store a file in the cloud. In the case where a file is to be saved automatically, the indication may be an automatic save instruction or operation. For example, the indication may be received from a user of a user device, wherein the user of the user device does not want to store the file locally on the user device.

In one implementation, the packets of the set of packets may comprise respective headers that may include respective information configured to be utilized to reassemble the file. According to another implementation, metadata, such as a file size, an erasure code used, packet indices, information related to where the packets are stored, and so on, may be stored. In one example, the metadata may be stored on a file system of the device that wants to store the file as metadata, such as in a file allocation table. In this case, the metadata is part of the file system and not necessarily the encoded packets that may be stored on other devices. In another example, some of the metadata or information may be stored in a packet header. For example, the metadata may be stored in a header for the encoded packets instead of the source packets. Block 102 may be followed by block 104.

At block 104, transform the set of source packets (e.g., source symbols) into a set of encoded packets by encoding the set of source packets (e.g., the set of source symbols) into a set of encoded packets. The encoded packets may comprise the symbols of a single codeword of an error-correcting code. According to some aspects, the set of source packets (e.g., the set of source symbols) are encoded by an erasure code. A codeword includes codeword symbols and each of the codeword symbols is an encoded packet. As discussed herein, the set of n codeword symbols constitute the codeword and a node (or device) may store one or multiple codeword symbols. Block 104 may be followed by block 106.

At block 106, facilitate storage of a first portion of the set of encoded packets to the data store of the network device and a second portion of the set of encoded packets to one or more user devices. A first number of packets in the first portion may be more than a second number of packets in the second portion.

The amount of packets in the first portion and the second portion may be selected such that most of the packets are stored on the network device(s) and a small portion of the packets are stored on the user device(s). By way of example and not limitation, for every 1,000 packets stored on the cloud there may be 1 packet stored on the user device. Thus, according to this example, the file may be divided into at least 1,001 packets. Additional packets may be generated for other devices (e.g., other user devices, other network devices).

According to some implementations, there may be a constraint related to the maximum amount of data that may be stored on the user device. The constraint may be imposed based on a memory capacity of the device, remaining (e.g., unused) memory capacity, and so on. The value of k source packets may be chosen by the user device based on the constraint, according to an implementation. Continuing the example in the preceding paragraph, if the user device is configured to store a maximum of 4 packets, the file may be divided into at least 4,004 packets.

Through utilization of cloud storage, users do not need to have local storage for their data. Further, the data may be easily available anywhere and on any device provided Internet connectivity is available. Further, the amount of data stored "in the cloud" is expected to grow considerably over time.

Furthermore, in addition to traditional computers accessing data (e.g., desktop computers, laptop computers, and so on), the data may also be stored from devices such as tablets and mobile phones. Some of the data may be confidential and/or private and storing this information in the cloud raises several security related issues.

One issue relates to whether the data may be trusted to a single cloud storage provider. Thus, dispersing the data across several independent cloud storage provides may increase security. For this purpose, erasure codes may be used to disseminate the information across the cloud storage providers. One disadvantage with this approach is that there needs to be sufficient cooperation and infrastructure between the cloud storage service providers to make this possible. Furthermore, the cloud storage providers may still cooperate or be forced to cooperate to recover the data of the user. Further still, an attacker (e.g., rogue user or rogue entity) may compromise (e.g., attack) the multiple cloud service providers and be able to recover the data of the user.

The disclosed aspects relate to increasing a security of cloud storage regardless of the use of a single cloud storage provider or multiple cloud storage providers. The user data should be safe even in the case that all storage providers would cooperate to recover the user data or when all storage providers are attacked. Further, the security may be increased while maintaining the advantages of cloud storage. In addition, the disclosed aspects may be utilized or adapted for use with mobile devices capable of accessing the user data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
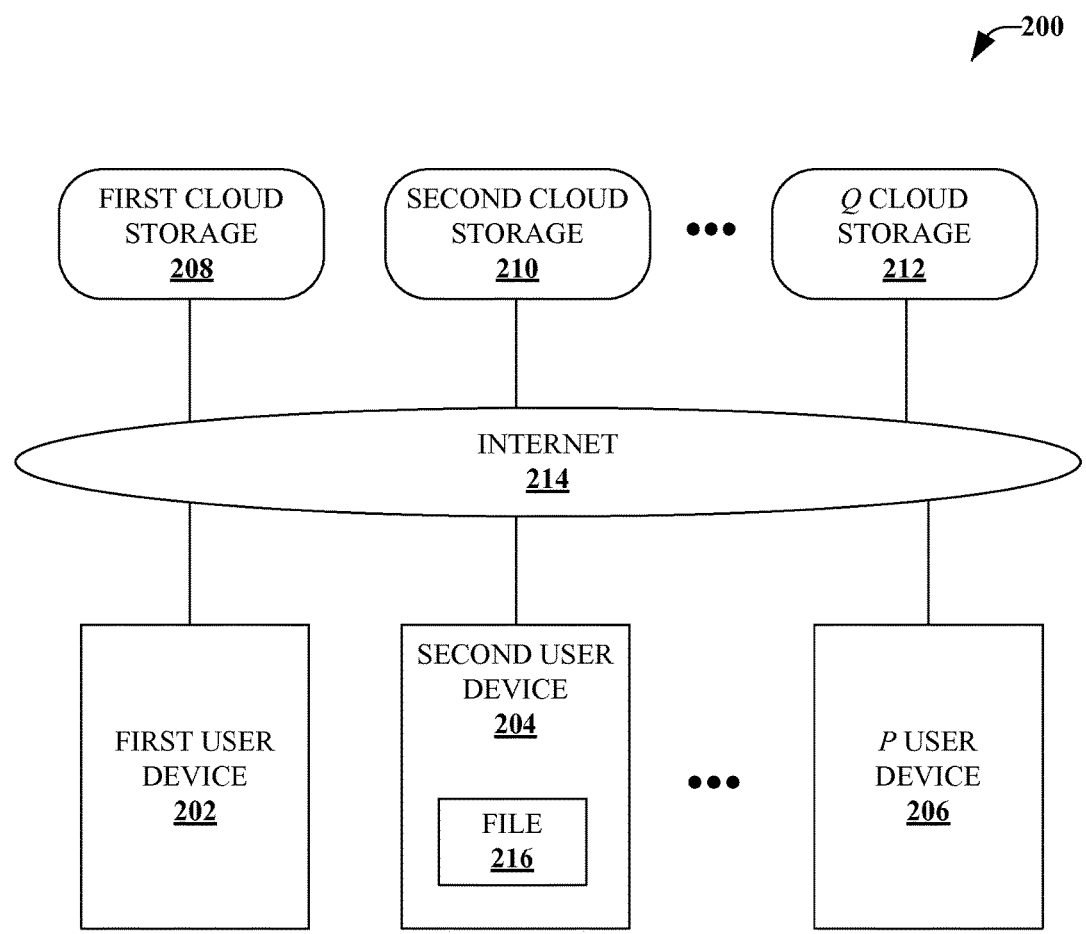
FIG. 2 illustrates an example, non-limiting embodiment of a system in which the disclosed aspects may be utilized.

FIG. 2 illustrates an example, non-limiting embodiment of a system 200 in which the disclosed aspects may be utilized. The system 200 represents an example, non-limiting architecture to provide an overview of a setting in which the disclosed aspects may operate. For example, illustrated are a set of user devices that may have access to one or multiple cloud storage providers. The user devices are labeled as a first user device 202, a second user device 204, and a P user device 206, where P represents any integer and denotes that any number of user devices may be utilized with the various aspects discussed herein. According to some implementations, only one or two user devices might be utilized. However, according to other implementations, more than two user devices might be utilized.

FIG. 2 also illustrates a set of cloud storage providers, labeled as a first cloud storage 208, a second cloud storage 210, and a Q cloud storage 212, where Q represents any integer and denotes that any number of cloud storage (e.g., network devices associated with a single cloud storage provider, network devices associated with two or more cloud storage providers, and so on) may be utilized with the disclosed aspects. According to some implementations, only one or two cloud storage providers might be utilized. However, according to other implementations, more than two cloud storage providers might be utilized.

The access by the set of user equipment devices to the cloud storage providers may be over an Internet 214. However, according to some implementations, the access between the set of user equipment devices and the set of cloud storage providers may be over a proprietary network that is provided by, for example, a telecom operator.

As discussed herein, it is assumed that the set of user devices may be under the control of a single user. Alternatively, the set of user devices may be under the control of a group of users that are allowed to share data. According to another embodiment, the other user devices only store the encoded packets. Thus, the other user devices do not have access to the original file and the users simply trust each other. Thus, a set of close friends may allow their devices to store some of the encoded packets for one of their friends. This friend can request data from the other friends when he wants to recover the original file.

Examples of user equipment devices include, but are not limited to, computers, laptops, tablets, mobile phones, and so on. Further, the user equipment devices may be other equipment or objects that are able to store information based on an external request (and are able to convey the information based on a request for the information). Examples of such equipment or objects include, but are not limited to, a music player that has a network connection or local storage, a car that comprises a multi-media system with local storage and network connection, and a smart thermostat that is connected to the Internet and has storage capability.

By way of example and not limitation, a user may operate the second user device 204, which may include a file 216 that is indicated as needing to be filed (or stored) remotely in the cloud. For example, the indication may be based upon a request by a user to store the file in the cloud. In another example, the indication may be based on an automatic storage of the file, wherein the file is stored, at least temporarily in the cloud.

According to various aspects, a large portion (e.g., about 99.9%, about 99.5%, about 99.2%, about 98.4%, about 96%, and so on) of the file 216 may be stored in the cloud by at least one storage provider of the set of cloud storage providers (e.g., the first cloud storage 208, the second cloud storage 210, or the Q cloud storage 212). A remainder of the file 216 may be stored on one or multiple user devices (e.g., the first user device 202, the second user device 204, or the P user device 206). The information (e.g., the file 216) may be stored in the cloud such that given the data stored on the cloud alone, the original file may not be recovered. Instead, data stored on one or more of the user devices are needed. Therefore, at about the same time as a user indicates he would like to recover the file (e.g., a request to open the file), the data stored in the cloud is requested together with part or all of the data stored on the user device(s). The data requested from the cloud storage providers and user devices together allows the original file to be recovered.

According to some implementations, parts of the individual file (e.g. original file) may not be recoverable. For example, storing 99.9% of a text file in the cloud and 0.1% on the user devices may allow the 99.9% to reveal most of the information stored in the original file with conventional implementations. However, according to various aspects, the original file may be split into k packets and n packets may be generated by an error-correcting code. A non-systematic error-correcting code may be used which ensures the original k packets do not appear in the n encoded packets. Thus, to recover the original file, at least k of the encoded packets are needed to reconstruct the original k packets. Furthermore, each of the encoded packets alone (or even together when less than k are considered) may not provide enough information about the original packets. Further, an original file may have redundancy such that one may try to guess the original file from less than k encoded packets. This may be mitigated by first removing the redundancy in the original file by compressing the file using an appropriate compression method.

It is noted that the term "original file" is used herein to refer to a file that is in a condition prior to the file being divided into packets and stored among data store(s) of the cloud service provider(s) and user device(s). Therefore, an original file might refer to a file saved for a first time, a modified file, an annotated file, or any other revised file. Further, the term "file" is utilized herein to denote data or a set of data saved in a variety of formats including a word processing application, a spreadsheet application, a photo application, a video application, an audio application, and so on. When the file saved to the cloud is requested by the user, the packets of data are recovered such that the original file is presented to the user.

Figure 3:
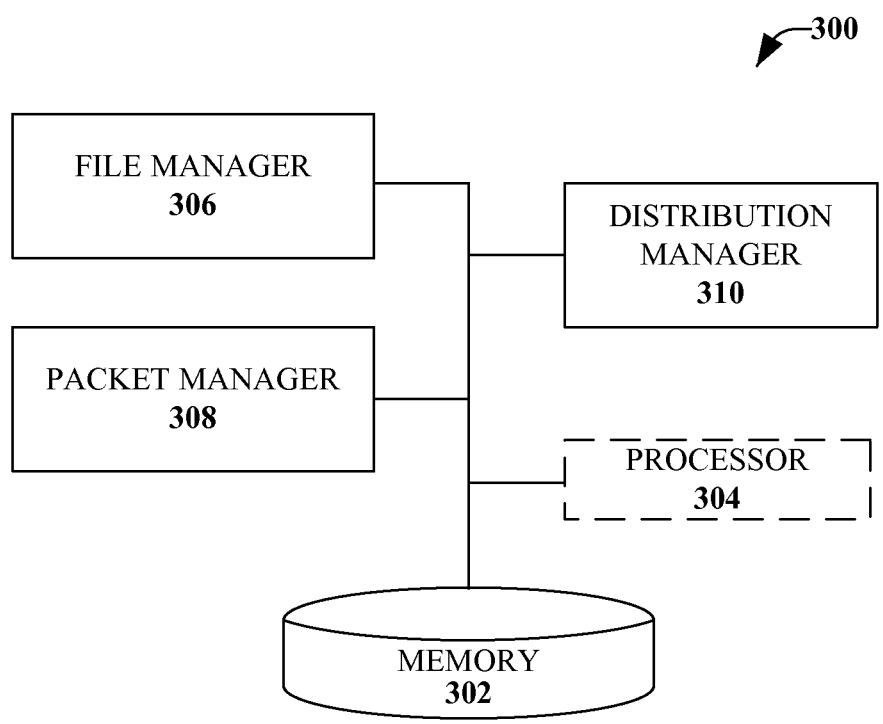
FIG. 3 illustrates an example, non-limiting embodiment of a system for storing a file in the cloud, according to an aspect.

FIG. 3 illustrates an example, non-limiting embodiment of the system 300 for storing a file in the cloud, according to an aspect. A small fraction of data may be stored on one or more user devices and a larger fraction of the data may be stored on network devices (e.g., cloud storage devices). The data stored in the cloud storage provider(s) itself may be useless without at least some of the data stored on the user device(s). In a similar manner, the data stored on the user device(s) itself is useless without at least some of the data stored on the cloud storage provider(s). Since the small fraction of data stored on the user device(s) may be as small as 0.1% (or even smaller) of the total amount of data, the requirements at the user device(s) are negligible.

Further, it may be difficult for a rogue user (e.g., an attacker) to gain access to the data since both the cloud storage provider(s) and the user device(s) need to be compromised. The attacker would even have to be physically co-located with some of the devices (e.g., user devices, network devices or cloud storage providers) to be able to gain access. Further, encryption technology may be used to further increase security. Thus, a user may be provided confidence that the data is protected since security does not depend on the cloud storage providers alone. For example, if a user keeps his device safe, the data will be protected according to the aspects discussed herein.

The system 300 may include at least one memory 302 that may store computer-executable components and instructions. The system 300 may also include at least one processor 304, communicatively coupled to the at least one memory 302. Coupling may include various communications including, but not limited to, direct communications, indirect communications, wired communications, and/or wireless communications. The at least one processor 304 may be operable to execute or facilitate execution of one or more of the computer-executable components stored in the memory 302. The processor 304 may be directly involved in the execution of the computer-executable component(s), according to an aspect. Additionally or alternatively, the processor 304 may be indirectly involved in the execution of the computer-executable component(s). For example, the processor 304 may direct one or more components to perform the operations.

It is noted that although one or more computer-executable components may be described herein and illustrated as components separate from the memory 302 (e.g., operatively connected or coupled to the memory 302), in accordance with various embodiments, the one or more computer-executable components might be stored in the memory 302. Further, while various components have been illustrated as separate components, it will be appreciated that multiple components may be implemented as a single component, or a single component may be implemented as multiple components, without departing from example embodiments.

A file manager 306 may be configured to divide a file into a first set of packets. According to an implementation, each packet in the first set of packets may comprise a respective header that may comprise respective information used to reassemble the file.

Alternatively or additionally, the file manger 306 may be configured to generate a block of metadata. The metadata may include information related to the file, such as the size of the file. The file manager 306 may maintain a file allocation table that stores the metadata required to reassemble the file. The metadata may be distributed over the packets stored in a file allocation table, and so on.

A packet manager 308 may be configured to encode the first set of packets and produce a second set of packets. A quantity of the second set of packets may be determined based in part on a number of data stores into which the second set of packets are to be stored. For example, if the second set of packets is to be stored on three network devices (e.g., cloud storage providers), there are at least four packets in the second set of packets. Thus, one packet may be stored on each of the three network devices and one packet may be stored on a user device.

A distribution manager 310 may be configured to transmit a first portion of the second set of packets to one or more data stores associated with one or more network devices. Further, the distribution manager 310 may be configured to transmit a second portion of the second set of packets to a user device. According to an implementation, the file may be reassembled using the second portion and at least a subset of the first portion. Thus, the user device(s) is needed to reassemble the file in conjunction with at least some of the packets stored on the network devices.

Figure 4:
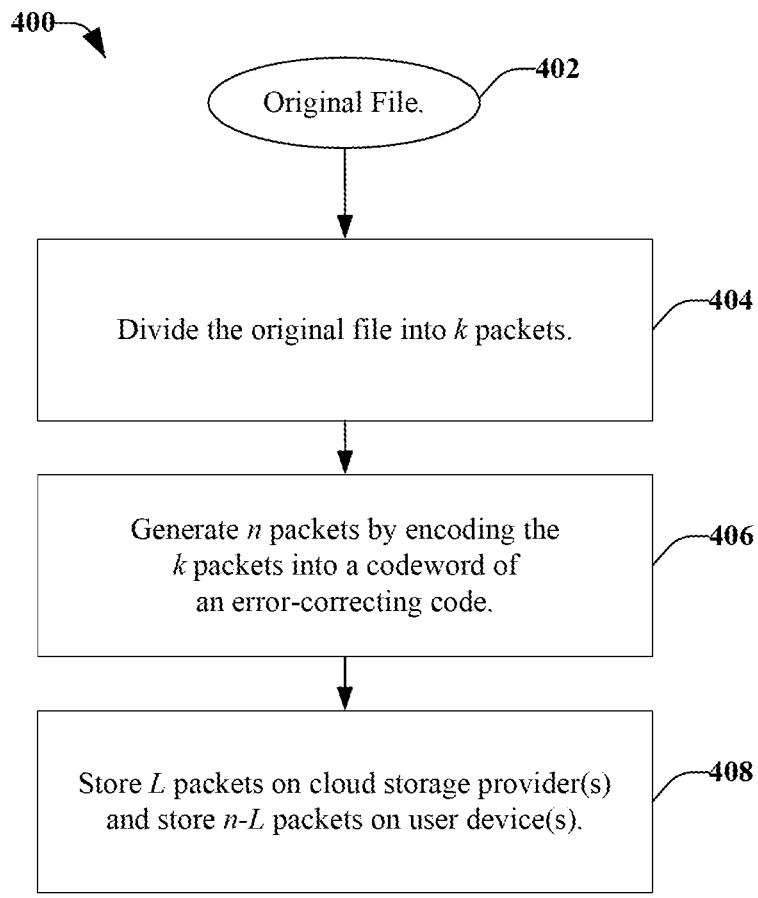
FIG. 4 illustrates an example, non-limiting flow diagram for storing a file in the cloud and on one or more user devices, according to an aspect.

FIG. 4 illustrates an example, non-limiting flow diagram 400 for storing a file in the cloud and on one or more user devices, according to an aspect. The flow diagram 400 in FIG. 4 may be implemented using, for example, any of the systems, such as the system 300 (of FIG. 3), described herein.

An input to the flow diagram 400 may be an original file 402 that needs to be stored. A user may indicate the original file 402 is to be stored in the cloud based on a selection chosen by the user when saving the file. According to other aspects, the file may be stored in the cloud based on predetermined settings or other criteria (e.g., the memory of the user device does not have enough capability and, thus, the file is automatically saved to the cloud based on predetermined settings).

Beginning at block 404, the original file is divided into k parts or source packets, where k is an integer. According to an implementation, the k source packets may be the same or a similar size. However, according to some implementations, it may not be possible to divide the file into k packets of similar sizes. Thus, a sequence of symbols designated as a filler symbol, such as zeros ("0s"), may be appended to one or more of the k source packets to achieve packets of the same, or a similar, size. Further, according to some implementations, each packet of the k source packets may comprise a header. Each header may include a packet number and a field that indicate the original number of bytes in the packet.

According to an implementation, a header may not be included in the source packets. Instead, there may be a header in the encoded packets. This header might contain, for example, an index of the encoded packets with respect to the codeword. In another implementation, no headers may be utilized for the packets, but storing the information in the file allocation system of the file system may be used. The file allocation system may comprise, for each file the error-correcting code used, the parameters k, n, and the nodes on which packets are stored and the indices of the packets stored at those nodes.

In one example, stored in a retrievable format may be an indication of the size of the original file and the error-correcting code used. This information may be stored in the header of the encoded packets, source packets, or in a file allocation table of the file system. Furthermore, to decode the error-correcting code, the codeword symbol that each encoded packet corresponds to is needed. This information may be stored in a header of the encoded packets or in a file allocation table of the file system used, for example. Block 404 may be followed by block 406.

At block 406, an error-correcting code or erasure code may be used to encode the k source packets into n encoded packets, where n is an integer equal to or greater than k. The error-correcting code or erasure code may have a property so that the original file 402 may be recovered from any k packets of the n encoded packets that are correct (e.g., not erased or faulty). An example of an error-correcting code that may have this property is a Reed-Solomon code. However, other types of codes may be utilized with the disclosed aspects.

For example, a code may also be used that may recover the original file 402 from any k+e of the n encoded packets with a high probability (e.g., about 99.9%, about 99.2%, about 97.8%, about 95%, and so on), where e is a small integer. An example of an error-correcting code that may be utilized in this example is the Raptor code.

According to some implementations, the erasure code or error-correcting code may be a non-systematic code. According to a non-systematic code, the output symbols do not contain the input symbols. When a non-systematic code is used, the original k source packets are not a part of the n encoded packets. Thus, no information is revealed until k packets out of the n encoded packets are available.

The input symbols may be defined as follows. The file is divided into source packets. The source packets are interpreted as source symbols for an error-correcting code or erasure code and encoded symbols/packets are generated by encoding the source symbols into a codeword of which the components are codeword symbols or encoded packets. In one example implementation, the encoding is such that the source packets do not directly appear in the encoded packets. According to an embodiment, the encoded packets stored in the cloud are not equal to the source packets. However, further to this embodiment, some or all of the encoded packets on the trusted user devices may be equal to the source packets.

According to some implementations, a header may be added at block 406. For example, this header may comprise the index of the codeword symbol or encoded packet. This may be used for the decoding. In accordance with another implementation, this may include keeping indices of the packets stored at each of the nodes in the network, on the user device, or the user file system.

Further, in implementations where additional security may be needed, the original file may be compressed before dividing the original file into source packets. By compressing the original file first, any redundancy may be reduced and attacks based on guessing the original file based on the knowledge of a few packets are less likely to succeed.

According to some implementations, each of the k source packets of the original file may be encrypted before being encoded by the erasure code or error-correcting code. In some cases, the encryption and/or encoding may be updated periodically to make it harder for an attacker to compromise the data. An attacker would have to collect at least k encoded packets in total between two updates to gain access to the information. Such k packets would have to be stolen from the cloud and the user devices.

According to additional or alternative implementations, another way to obtain security may be to use the error-coding capability of the code used. Many codes may not only correct for erasures but also corrupted data may be corrected. This may be used by the encoding device to randomly corrupt some of the data that is to be stored on the cloud. This may make it harder for an attacker since the data he could steal may, in fact, be just corrupted data. In this case, all n packets may be required to construct the original file and an attacker would have to acquire all these n packets. Block 406 may be followed by block 408.

At block 408, a subset of L encoded packets of the n encoded packets may be stored at one or more cloud storage providers, where L is an integer and is less than k (L<k). Further, n-L of the encoded packets may be stored on one or more user devices. The L encoded packets stored on the one or more cloud storage providers (e.g., in the cloud) may have a size close to the size of the original file 402. For example, the size close to the size of the original file 402 refers to a similar amount of information that is contained in the original file 402. However, from these L encoded packets, the original file 402 may not be recovered. Instead, at least k-L of the n-L encoded packets that are stored on the one or more user devices may be required also to recover the original file 402.

The one or more user devices on which to store the n-L packets may be determined by the user and/or may be based on user preferences. According to some implementations, the determination as to which user devices to store the n-L packets may be determined automatically based on storage capacity, remaining storage bandwidth, usage of respective user devices, and so on. According to some implementations, the number of encoded packets stored on each of the user devices may determine which subset of user devices may provide at least k-L encoded packets that allow for a successful reconstruction of the original file 402.

Figure 5:
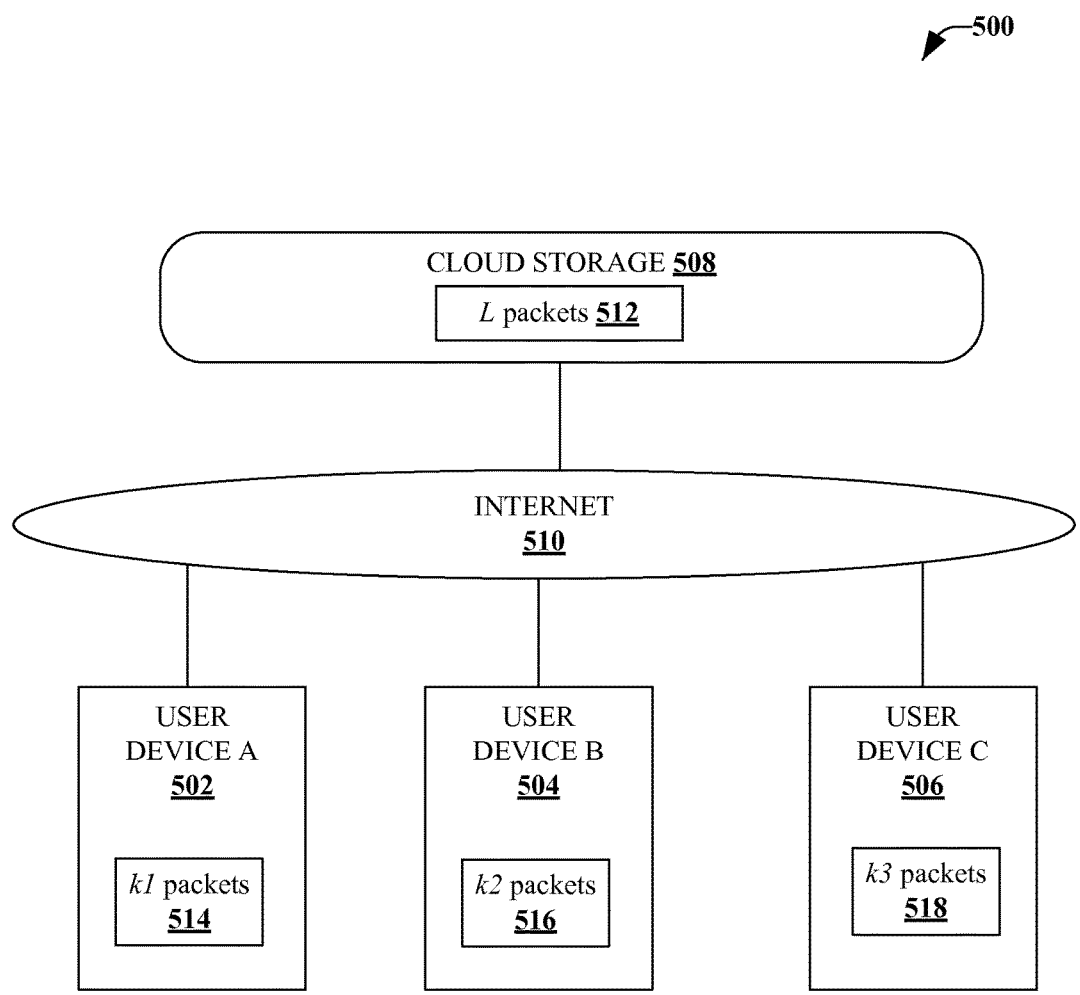
FIG. 5 illustrates an example, non-limiting embodiment of a system in which the disclosed aspects may be utilized.

FIG. 5 illustrates an example, non-limiting embodiment of a system 500 in which the disclosed aspects may be utilized. The system 500 may represent an example, non-limiting architecture to provide an overview of a setting in which the disclosed aspects may operate.

Illustrated are a set of user devices, labeled as a user device A 502, a user device B 504, and a user device C 506. Although three user devices are illustrated and described, the various aspects may be utilized with fewer or more user devices and three user devices are discussed for purposes of simplicity. Also illustrated is a single cloud storage provider that provides a cloud storage 508 over an Internet 510 to a user that owns (or has access to) the set of user devices.

For purposes of explanation, the user device B 504 is a main device (e.g., the device which the user is currently operating and from which a file is to be saved or stored in the cloud). Thus, illustrated is a scenario where an original file was present in the main device (e.g., the user device B 504), as was illustrated in FIG. 2. As depicted in FIG. 5, the original file has been divided into k source packets and encoded into n encoded packets by an erasure code. A number of L<k of the n encoded packets may be stored in the cloud storage 508, labeled as L packets 512 and another number of k=k1+k2+k3 encoded packets are stored on the user devices. In this example, a first set of packets, k1 packets 514, are located on the user device A 502, a second set of packets, k2 packets 516, are located on the user device B 504, and a third set of packets, k3 packets 518, are located on the user device C 506.

The integers L, k1, k2, and k3 satisfy the equation n=L+k1+k2+k3. Thus, the total number of packets stored in the cloud and on the user devices equals n.

The parameters n, L, k1, k2, and k3 may be chosen based on a multitude of factors. Regardless of the factors used to determine the parameters, the parameters are chosen such that parameter L is chosen to be less than parameter k. In this manner, the original file may not be reconstructed from the data stored in the cloud storage 508 alone. The parameters k1, k2, and k3 may be chosen such that any of the encoded packets stored on the user devices may suffice to complement the L packets stored in the cloud storage 508 such that the original file may be recovered. Further, since any of the encoded packets stored on the user device may be utilized to recover the file, if a user device is lost or stolen, the data is still recoverable from another user device.

According to another implementation, the parameters k1, k2, and k3 may be chosen in such a way that the encoded packets of two out of three user devices, in this example, are needed to complement the L packets 512 stored in the cloud storage 508 and the original file may be recovered. In accordance with further implementations, other options exist and the value of n may be chosen based on the values of k1, k2, and k3.

By way of example and not limitation, consider a numerical example where the original file has a size of 1,000,000,000 bytes. The chosen value of k is 10,000. This implies that the original file may be divided into 10,000 parts or portions. Each part or portion may have a size of 100,000 bytes. The value of n may be chosen as n is equal to 10,010. Thus, 10,010 encoded packets may be generated by encoding the k source packets by an erasure code. The value of L may be chosen as L is equal to 9,980. Thus, 998,000,000 bytes (e.g., 99.8%) may be stored in the cloud storage 508. Further to this example, there are a remaining number of n-L=30 encoded packets that may be evenly spread on the three user devices. However, according to some implementations, the remaining number of encoded packets may be unevenly spread on the three user devices. Therefore, in this example, each of the user devices contains 10 encoded packets, which amounts to a total size of 1,000,000 bytes.

Continuing the example, the original file may be recovered from the 9,980 packets that are stored in the cloud storage 508 and any 20 additional packets that are stored on the user devices. Since each user device stores 10 packets, at least two user devices are needed (in this example) to recover the original file. Further details related to recovery of the original file will be provided below with respect to FIG. 8.

Figure 6:
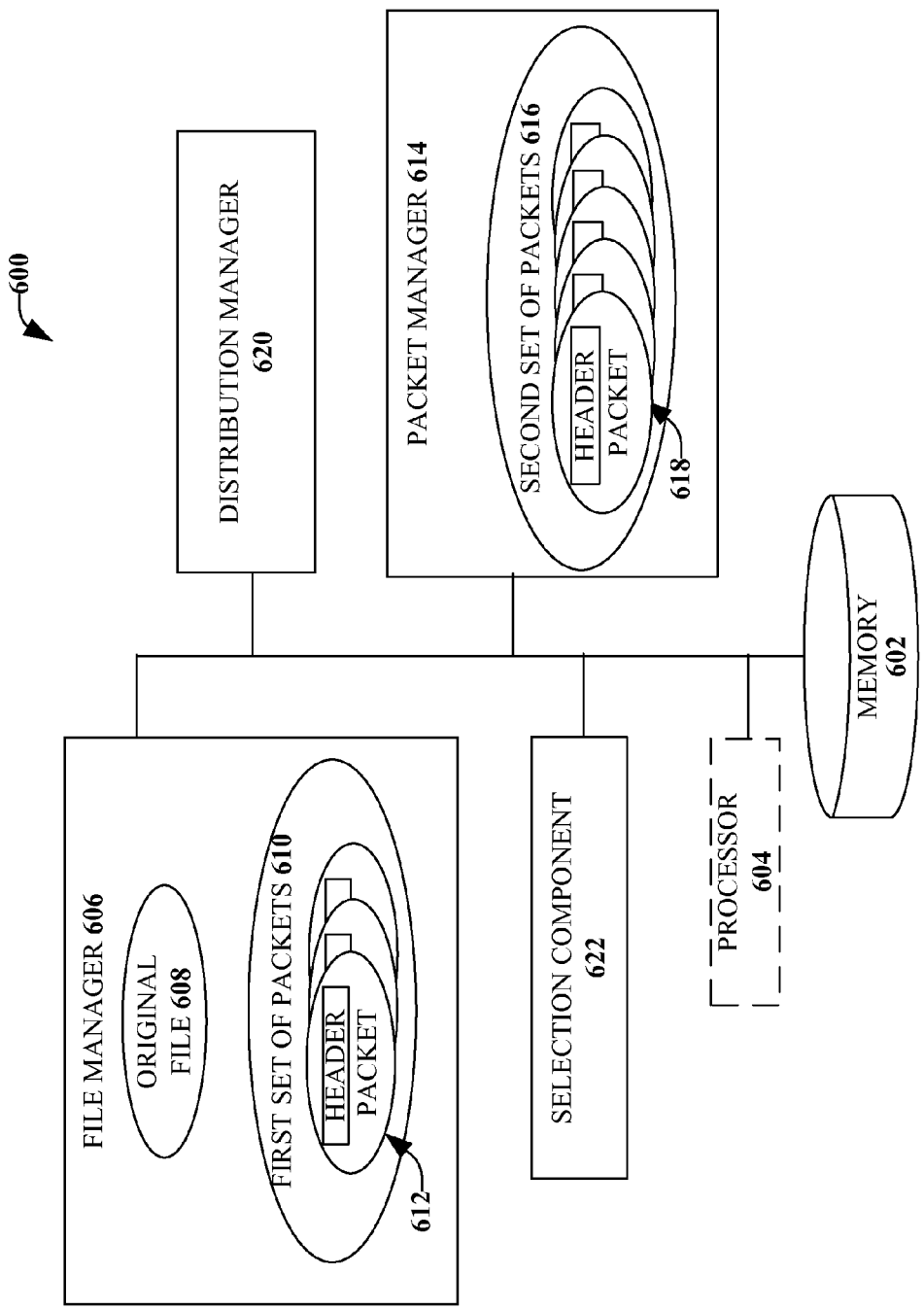
FIG. 6 illustrates another example, non-limiting system for secure storage of data on network devices and user equipment, according to an aspect.

FIG. 6 illustrates another example, non-limiting system 600 for secure storage of data on network devices and user equipment, according to an aspect. The system 600 may include at least one memory 602 that may store computer-executable components and instructions. The system 600 may also include at least one processor 604, communicatively coupled to the at least one memory 602. The at least one processor 604 may be operable to execute or facilitate execution of one or more of the computer-executable components stored in the memory 602. The processor 604 may be directly involved in the execution of the computer-executable component(s), according to an aspect. Additionally or alternatively, the processor 604 may be indirectly involved in the execution of the computer executable component(s). For example, the processor 604 may direct one or more components to perform the operations.

It is noted that although one or more computer-executable components may be described herein and illustrated as components separate from the memory 602 (e.g., operatively connected or coupled to the memory 602), in accordance with various embodiments, the one or more computer-executable components might be stored in the memory 602. Further, while various components have been illustrated as separate components, it will be appreciated that multiple components may be implemented as a single component, or a single component may be implemented as multiple components, without departing from example embodiments.

A file manager 606 may be configured to divide an original file 608 into sets of source packets. For example, the file manager 606 may divide the original file 608 into a first set of source packets 610. As illustrated, the first set of source packets 610 may include multiple packets 612, where each packet of the multiple packets 612 may include a header. Each header may include respective information used to reassemble the original file 608.

A packet manager 614 may be configured to encode the first set of source packets 610 and produce a second set of packets 616 (e.g., a set of encoded packets). A quantity of packets 618 included in the second set of packets 616 may be determined based on a number of data stores into which the second set of packets are to be stored. According to an implementation a quantity of packets 618 in the second set of packet 616 is equal to, or more than, the quantity of the multiple packets 612 included in the first set of source packets 610.

A distribution manager 620 may be configured to transmit a first portion of the second set of packets 616 to one or more data stores associated with one or more network devices (e.g., the first cloud storage 208, the second cloud storage 210, and/or the Q cloud storage 212 of FIG. 2). Further, the distribution manager 620 may be configured to transmit a second portion of the second set of packets 616 to a user device (e.g., the first user device 202, the second user device 204, and/or the P user device 206 of FIG. 2). When the file is reassembled, the file may be reassembled using the second portion and at least a subset of the first portion. According to some implementations, the system 600 may be configured to use all of the packets in the cloud. For instance, n=k and 1 packet is stored at the user device. Thus, k−1 packets are stored in the cloud and all the packets are needed for reconstruction of the original file.

For example, the distribution manager 620 may be configured to transmit a first subset of the first portion to a first network device of one or more network devices. Further, the distribution manager 620 may be configured to transmit a second subset of the first portion to a second network device of the one or more network devices. The first network device and the second network device may be controlled by different network provider devices associated with different network service provider identities.

In another example, the distribution manager 620 may be configured to transmit the second portion of the second set of packets to the user device. In this example, the user device may be determined to be located in a similar geographic area as the one or more network devices. For example, the user device and the one or more network devices may be located within a certain distance of each other.

According to an implementation, a selection component 622 may be configured to determine the user device and at least another user device for storage of the second portion of the second set of packets 616. Further to this implementation, the distribution manager 620 may transmit a first subset of the second portion to the user device and a second subset of the second portion to the other user device. The user device and at least the other user device may be associated devices. For example, the user device and at least the other user device may be registered to a single user. In another example, the user device and at least the other user device may be controlled by a single user. In a further example, the user device and at least the other user device may be controlled by a group of users (e.g., a family, friends, employees working in a same department, and so on).

In accordance with an implementation, the selection component 622 may be configured to determine the user device based on a geographic restriction. For example, the geographic restriction may be determined to be present between the user device and the one or more data stores associated with the one or more network devices. Thus, when the user device is within a certain geographic range of the one or more data stores, the geographic restriction is satisfied. When the user device is moved out of the geographic range, the geographic restriction is no longer satisfied.

According to another implementation, the selection component 622 may be configured to determine the user device and the other user device for storage of the second portion of the second set of packets based on respective locations of the user device and the other user device during the storage of the second portion. Further to this implementation, the distribution manager 620 may transmit a first subset of the second portion to the user device and a second subset of the second portion to the other user device. The first subset and the second subset may be both used to reconstruct the original file 608.

Figure 7:
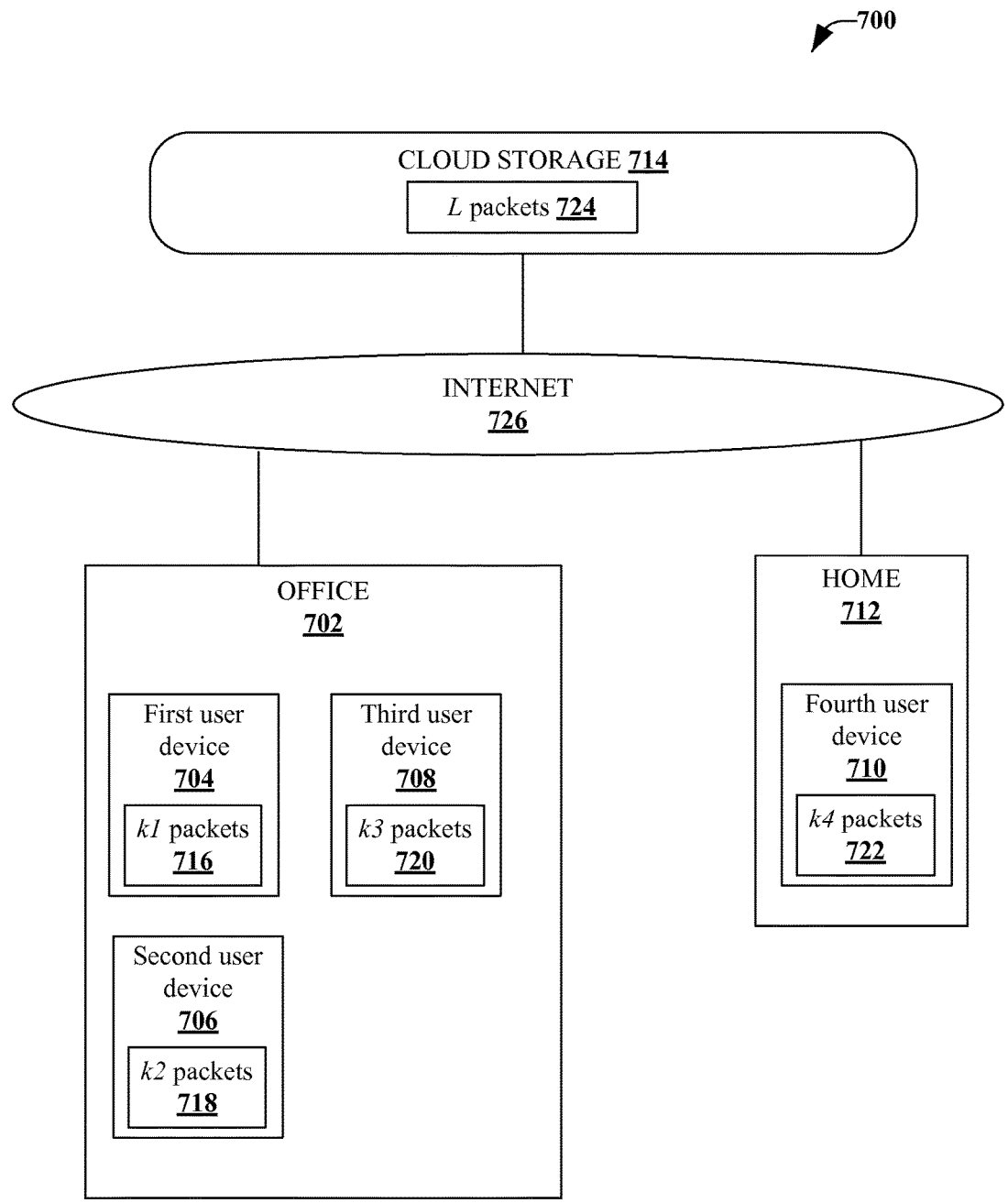
FIG. 7 illustrates an example, non-limiting embodiment of another system in which the disclosed aspects may be utilized.

FIG. 7 illustrates an example, non-limiting embodiment of another system 700 in which the disclosed aspects may be utilized. The system 700 represents an example, non-limiting architecture to provide an overview of a setting in which the disclosed aspects may operate. For example, the system 700 may be configured for partial cloud data storage with local exchange of encoded packets, according to an aspect. When a file is divided into packets, the encoded packets may be distributed over multiple user devices. Further, various parameters may be chosen in such a way that at least a subset of the multiple user devices are required to supply their encoded packets to allow for construction of the original file.

FIG. 7 illustrates a scenario where the user devices may be a laptop, a smart watch, a car, a router, and so on. In this example scenario, a user may be at his office 702 while he is associated with at least three user devices, illustrated as a first user device 704, a second user device 706, and a third user device 708. For example, while at the office 702 the user may be using his laptop (e.g., the first user device 704) to work for his employer. Further, the user may be wearing a smart watch (e.g., the second user device 706). In addition, his car (e.g., the third user device 708) may be parked in a parking garage. In this example scenario, the user is also associated with a fourth user device 710, which may be a router located in a residential building (e.g., a home 712) of the user.

The user devices may be configured in such a way that only encoded packets are exchanged among devices that are geographically close. For example, when a file that is stored in the cloud (e.g., a cloud storage 714) is to be accessed on the laptop (e.g., the first user device 704), only user devices that are near may provide encoded packets. In FIG. 7, this may be just the smart watch (e.g., the second user device 706) that is worn by the user. Such functionality may be achieved by the laptop (e.g., the first user device 704) requesting the encoded packets from the other user devices and revealing its location. The other user devices may or may not respond depending on their physical location. Another option is to always request such encoded packets by, for example, a local ad hoc network that may be established between the user devices that are in close proximity. Such a network may be established by, for example, Wi-Fi, Bluetooth, or another means of proximity communications.

As illustrated, the first user device 704 stores a set of k1 encoded packets 716, the second user device 706 stores a set of k2 encoded packets 718, the third user device 708 stores a set of k3 encoded packets 720, and the fourth user device 710 stores a set of k4 encoded packets 722. Further, the cloud storage 714 stores a set of L packets 724. The connectively between the cloud storage 714 and the user devices may be over the Internet 726, as illustrated, or over another network (e.g., a local area network).

Together with the set of packets L stored on the network devices and the set of encoded packets n, the parameters k1, k2, k3, and k4 may be chosen in several ways. For example, the parameters k1, k2, k3, and k4 may be chosen such that the original file may be recovered when any two devices are geographically close and able to provide encoded packets. According to another example, the parameters k1, k2, k3, and k4 may be chosen such that any three devices are needed to recover the original file. However, other combinations are also possible.

The scenario illustrated in FIG. 7 may be extended to include devices that belong to the company. For example, a user device that is a company server may be present in the office 702 also and the system 700 may be configured in such a way that data may only be accessed when the user is physically close to a company server and has the company smart phone (or other company device) with him In this embodiment, the system 700 may be configured in such a way that all n-L encoded packets are stored on the company server and company smart phone (or other device). A user may still access data from the laptop, but needs to be able to receive the encoded packets from the company server and the company smart phone.

According to some implementations, many different objects may have connectivity and may have the ability to store a small amount of information. Examples of such objects include smart thermostats, light bulbs, refrigerators, washing machines, clothes dryers, televisions, and so on. Each of these objects may be used as a user device to store encoded packets according to the aspects discussed herein.

Figure 8:
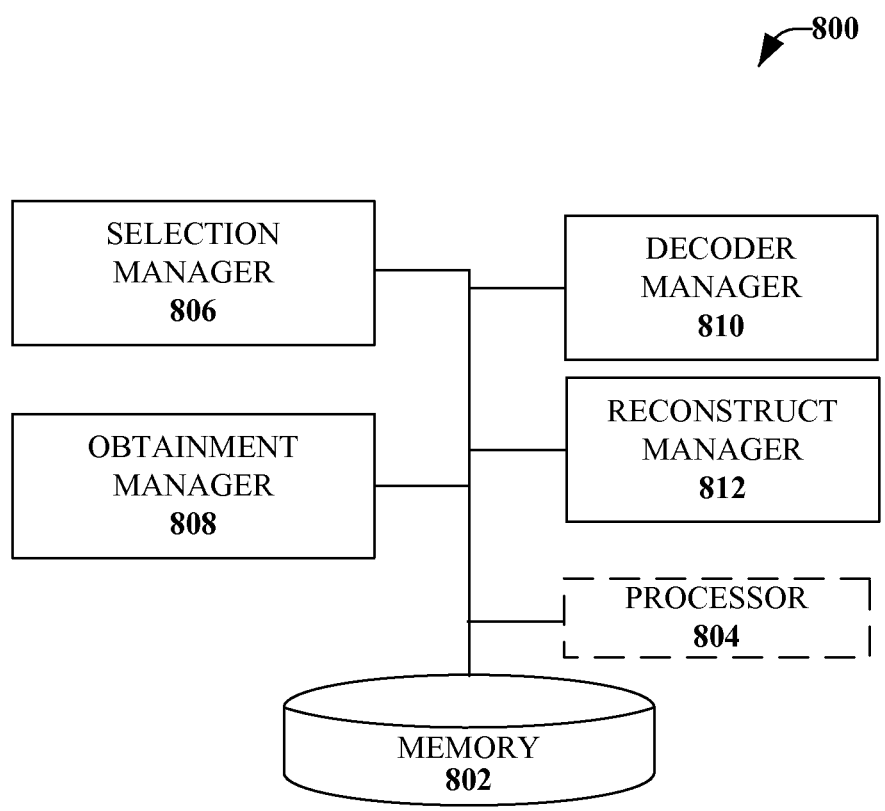
FIG. 8 illustrates an example, non-limiting system for recovery of an original file, according to an aspect.

FIG. 8 illustrates an example, non-limiting system 800 for recovery of an original file, according to an aspect. The system 800 may include at least one memory 802 that may store computer-executable components and instructions. The system 800 may also include at least one processor 804, communicatively coupled to the at least one memory 802. The at least one processor 804 may be operable to execute or facilitate execution of one or more of the computer-executable components stored in the memory 802. The processor 804 may be directly involved in the execution of the computer-executable component(s), according to an aspect. Additionally or alternatively, the processor 804 may be indirectly involved in the execution of the computer-executable component(s). For example, the processor 804 may direct one or more components to perform the operations.

It is noted that although one or more computer-executable components may be described herein and illustrated as components separate from the memory 802 (e.g., operatively connected to memory), in accordance with various embodiments, the one or more computer-executable components might be stored in the memory 802. Further, while various components have been illustrated as separate components, it will be appreciated that multiple components may be implemented as a single component, or a single component may be implemented as multiple components, without departing from example embodiments.

The system 800 may include a selection manager 806 that may be configured to select one or more user devices, from a set of user devices, to provide k-L packets (e.g., encoded packets). Thus, the user devices chosen to provide the k-L packets required for recovery of the original file may be selected by the selection manager 806 based on several factors. For example, the user devices chosen by the selection manager 806 may be based on the user devices that respond the fastest. In another example, the user devices chosen by the selection manager 806 may be the user devices from the set of user devices that have a highest data transfer capability. Other parameters associated with the user devices might also be utilized by the selection manager 806 such as, for example, a user preference, a most frequently used device, a memory size, a screen or display size, and so on. Alternatively or additionally, the selection by the selection manager 806 may be of the user devices that are physically close to the main device (e.g., location based file recovery).

An obtainment manager 808 may be configured to obtain a first set of packets from one or more network devices and a second set of packets from the one or more selected user devices. For example, the obtainment manager 808 may request L packets from cloud storage provider(s) and request k-L packets from the selected user devices. According to an implementation, the obtainment manager 808 may be configured to obtain less than a total amount of the first set of packets from the one or more network devices.

A decoder manager 810 may be configured to decode the first set of packets and the second set of packets. For example, the decoder manager 810 may be configured to determine an error correcting code or an erasure code used to encode the first set of packets and the second set of packets. For example, the error correcting code may be a code wherein output symbols of the first set of packets and the second set of packets do not include input symbols of the file.

According to some implementations, the original file might be reconstructed based on a geographic location of one or more user devices. For example, consider a hospital that stores sensitive information related to patients. In accordance with the disclosed aspects, a hospital may store a large percentage of the patient data in the cloud. However, the cloud data itself is useless. A small amount of encoded packets may be stored locally at the hospital and at mobile devices used by medical doctors and/or patients. The various aspects may be configured such that some medical doctors may only access the data while at the hospital (and/or when the patient is at the hospital), while other medical doctors may also access the data at home or from another location. For the group of medical doctors that may access the data while away from the hospital, more information would be stored on their mobile device as compared to those medical doctors that may only access the data while at the hospital.

Further, patients may keep part of the encoded packets themselves. In this additional or alternative implementation, the parameters may be chosen such that the data may be recoverable only when the patient and at least one medical doctor are in the hospital and that they may supply encoded packets. According to another implementation, the data may be recoverable when two medical doctors together wish to access the information (e.g., to collaborate on patient care).

The system 800 may also include a reconstruct manager 812 that may be configured to reconstruct a file (e.g., an original file) based on the decoding performed by the decoder manager 810. For example, the reconstruct manager 812 may be configured to reconstruct the original file by decoding the k encoded packets into k source packets. For example, decoding the k encoded packets may include decoding the erasure code or error-correcting code to reconstruct the k source packets 404 of FIG. 4 based on the k encoded packets. The source packets may then be merged to lead to the original file.

Figure 9:
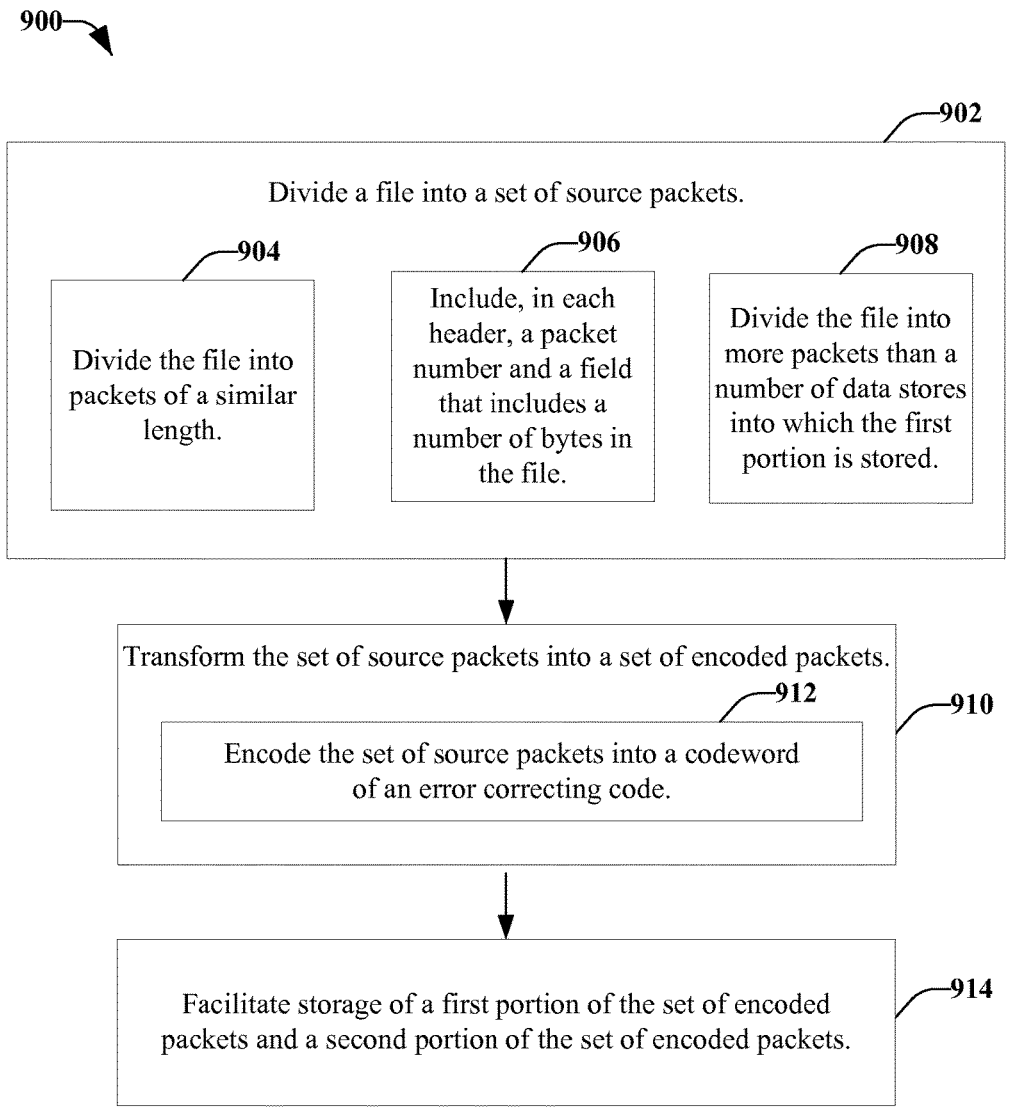
FIG. 9 illustrates an example, non-limiting flow diagram for partial cloud data storage with error-correcting codes.

FIG. 9 illustrates an example, non-limiting flow diagram 900 for partial cloud data storage with error-correcting codes. The flow diagram in FIG. 9 may be implemented using, for example, any of the systems, such as the system 600 (of FIG. 6), described herein.

Beginning at block 902, divide a file into a set of packets. The file may be divided into the set of packets in response to an indication that the file is to be stored in a data store of a network device (e.g., in the cloud). For example, a user of a user equipment might decide to store a file (e.g., an original file) and, due to constraints of the user device, efficiency purposes, or based on other considerations, may decide to save the file in the cloud. Thus, the user may interact with the user equipment and specify that, instead of saving the file locally, the file is to be saved to one or more network devices. Block 902 may include block 904, block 906, and/or block 908.

At block 904, divide the file into source packets that may have a same or similar length. For example, the file may be divided into equal (or nearly equal) portions. In the case where one or more of the packets are different lengths than other packets, one or more symbols designated as a filler symbol, such as a sequence of zeros or a sequence of another value, may be appended to each of the one or more packets. The number of filler symbols appended to the file may be selected such that the one or more packets are about the same length as the other packets.

Alternatively, at block 906, include, in each header of the respective header, a packet number and a field that includes a number of bytes in the file. In an additional or alternative embodiment, there may be a header for each of the encoded packets. The headers may contain an index indicating to which codeword symbol the respective encoded packet belongs. In addition, the header may comprise other data to facilitate the reconstruction of the original file. At about the same time as the file is divided into the set of packets, a header is associated with each packet. Each header may include information related to the information contained in the packet. Further, each header may include information that may be configured to be utilized to reconstruct the file. For example, when the user desires to review the file, the information included in various headers may be utilized to gather the appropriate packets and present the reconstructed file to the user.

Alternatively, at block 908, divide the file into more packets than a number of data stores into which a first portion of the packets is stored. For example, the set of packets may be determined to be stored in data stores of two or more network devices. For example, if the divided file is to be stored on seven network devices, the file is divided into eight or more portions. Block 902, block 904, block 906, or block 908 may be followed by block 910.

At block 910, transform the set of source packets into a set of encoded packets. According to an example, at block 910, each of the source packets is associated with a source symbol of an error-correcting code. The source symbols may then be encoded into a single codeword consisting of codeword symbols. These codeword symbols are packets also and these are the n encoded packets being stored in the cloud and user devices. Block 910 may include block 912.

At block 912, encode the set of source packets into codeword symbols of an error correcting code. The source packets may be interpreted as source symbols for an error-correcting or erasure code. The source symbols are then encoded into a codeword consisting of n code word symbols. These n codeword symbols are reinterpreted as n encoded packets and these encoded packets may be stored at the cloud nodes and user devices. According to some implementations, encoding the set of packets may include encoding the set of packets wherein packets of the set of packets are not included in the packets of the set of encoded packets. For example, the error correcting code may be a non-systematic code (e.g., the output symbols do not contain input symbols). Block 910 and/or block 912 may be followed by block 914.

At block 914, facilitate storage of a first portion of the set of encoded packets and a second portion of the set of encoded packets. For example, the first portion of the set of encoded packets may be stored at one or more network devices and the second set of packets may be stored at one or more user devices. According to an implementation, a first number of packets in the first portion may be more than a second number of packets in the second portion. For example, there may be twenty packets in the first portion and nineteen or less portions in the second portion. Further, at least some of the first portion and at least some of the second portion are used to decode the file.

According to an implementation, transforming the set of packets, at block 910, may include determining a quantity of packets for the second set of encoded packets. Further, the file may be reassembled from at least the second portion and at least a subset of the first portion.

Figure 10:
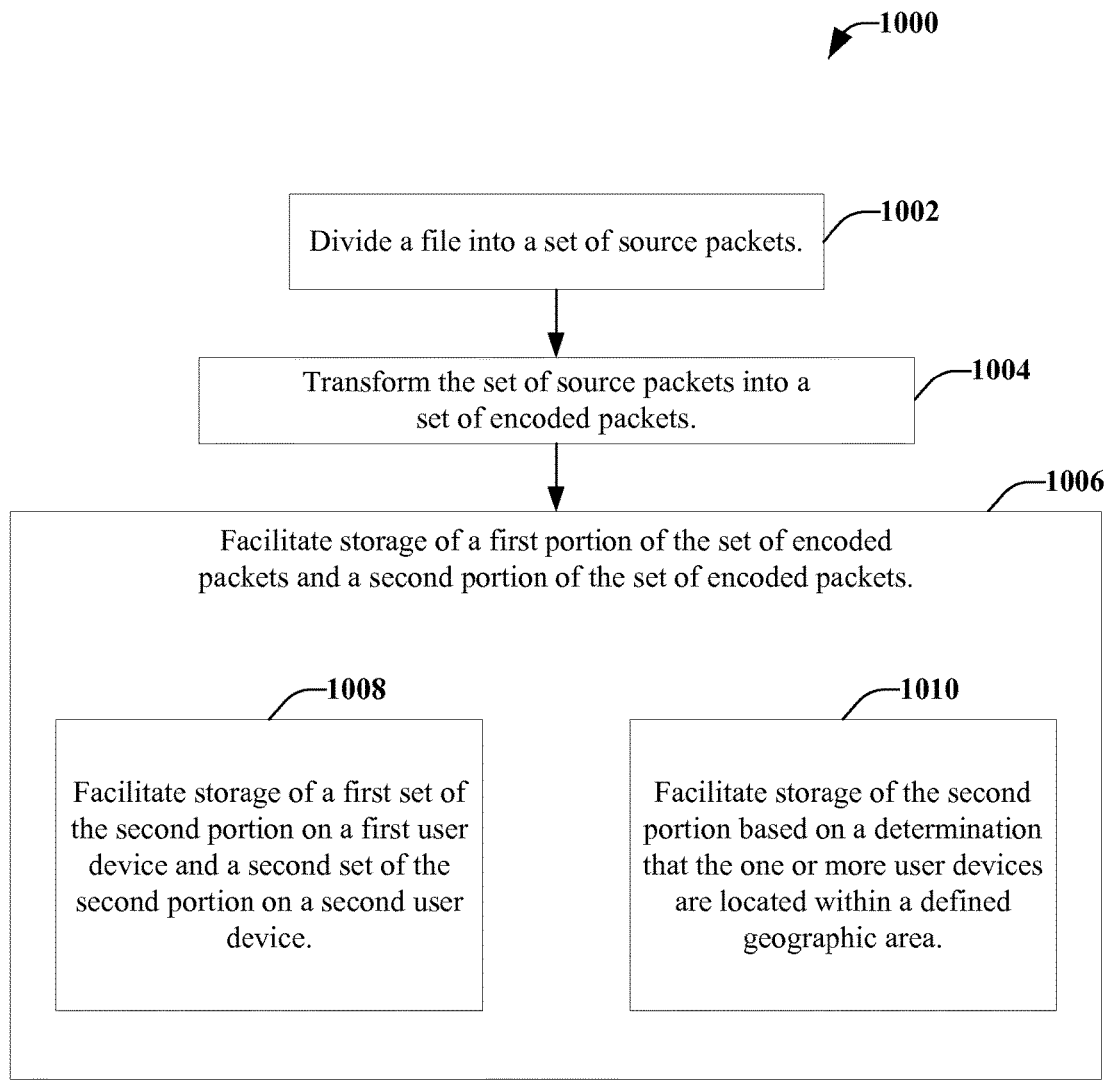
FIG. 10 illustrates an example, non-limiting flow diagram for storing a file in one or more network devices, according to an aspect.

FIG. 10 illustrates an example, non-limiting flow diagram 1000 for storing a file in one or more network devices, according to an aspect. The flow diagram 1000 in FIG. 10 may be implemented using, for example, any of the systems, such as the system 600 (of FIG. 6), described herein.

Beginning at block 1002, divide a file into sets of source packets. The file may be divided into the sets of source packets in response to an indication that the file is to be stored, at least partially, in the cloud. Block 1002 may be followed by block 1004.

At block 1004, transform the set of packets into a set of encoded packets, which may include encoding the set of source packets into codeword symbols of an error correcting code. Block 1004 may be followed by block 1006.

At block 1006, facilitate storage of a first portion of the set of encoded packets and the second portion of the set of encoded packets. For example, the first portion may be stored to a data store of a network device. According to another example, the first portion may be stored to two or more data stores of two or more network devices. In another example, the second portion may be stored to user equipment. According to other examples, the second portion may be stored to two or more user devices. Block 1006 may include block 1008 and/or block 1010.

At block 1008, facilitate storage of a first set of the second portion on a first user device and a second set of the second portion on a second user device. The first user device and the second user device may be associated devices. For example, the first user device and the second user device may be registered to a single user. In another example, the associated user devices may be controlled by a single user. In a further example, the associated user devices may be controlled by a group of users (e.g., a family, employees working in a same department, and so on).

At block 1010, facilitate storage of the second portion based on a determination that the one or more user devices are located within a defined geographic area. For example, user devices that are geographically located within a particular area (e.g., a work location, a hospital, a home network, and so on) might be utilized to store the second portion. Other user devices that are associated with the same entity (e.g., associated devices) that are not located in the geographic area when the second portion is being stored may not be considered as candidates for storage of the second portion.

According to an implementation, storage of a first set of the second portion is to a first user device and a second set of the second portion is to a second user device. The first and second user device may be determined to be located in a defined geographic area during the storage. Further, the first set and the second set may be both configured to be used to reassemble the file.

Figure 11:
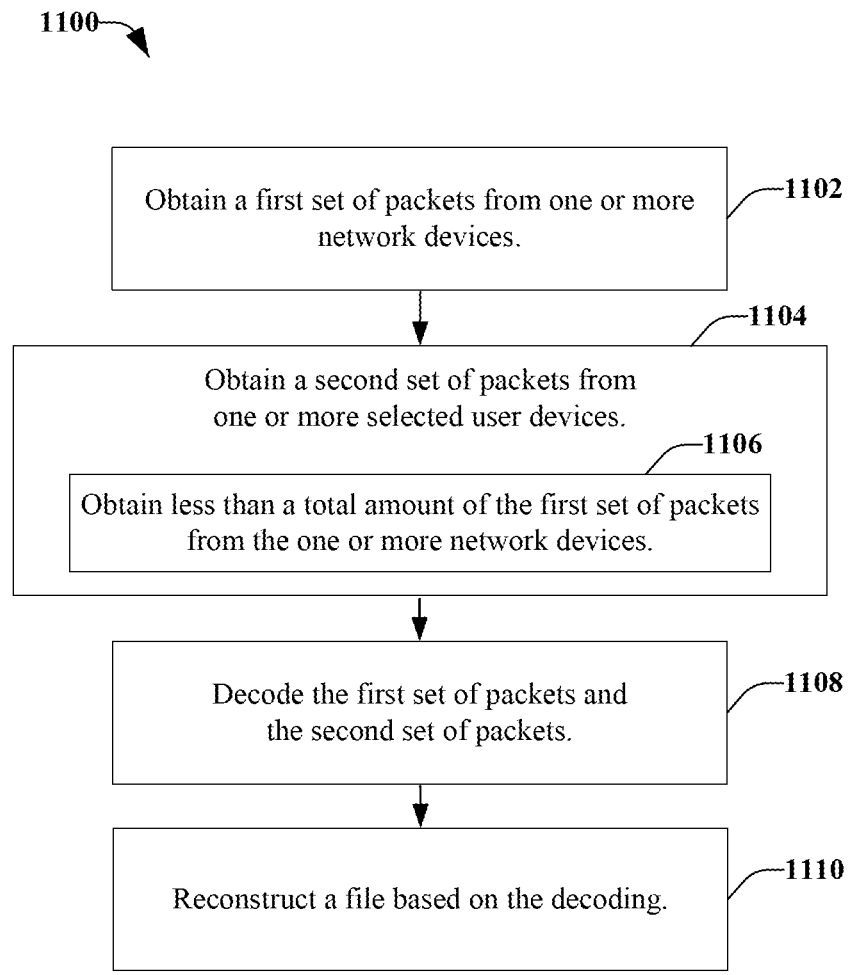
FIG. 11 illustrates an example, non-limiting flow diagram for reassembling a file at least partially stored in one or more network devices, according to an aspect.

FIG. 11 illustrates an example, non-limiting flow diagram 1100 for reassembling a file at least partially stored in one or more network devices, according to an aspect. The flow diagram 1100 in FIG. 11 may be implemented using, for example, any of the systems, such as the system 800 (of FIG. 8), described herein.

Beginning at block 1102, obtain a first set of packets from one or more network devices. The one or more network devices may be network devices associated with a single network service provider that provides cloud storage services. In another example, the one or more network devices may be network devices associated with two or more network service providers that provide cloud storage services. The two or more network service providers may be independent service providers (e.g., competitors), according to an implementation. Block 1102 may be followed by block 1104.

At block 1104, a second set of packets can be obtained from one or more selected user devices. For example, the one or more selected user devices may be devices that are associated with a single user or with a group of users. In another example, the user device may be associated with two different users, wherein the devices are independent devices (e.g., not associated devices). For example, in a healthcare setting, a first device may be controlled by a patient or a caregiver and a second device may be controlled by a healthcare provider, such as a doctor. According to an implementation, block 1104 may include block 1106.

At block 1106, less than a total amount of the first set of packets can be obtained from the one or more network devices. Block 1104 and/or block 1106 may be followed by block 1108.

At block 1108, decode the first set of packets and the second set of packets. To decode the sets of packets, the first set of packets and the second set of packets may be taken together, which can provide at least k packets (the dimension of the error-correcting code used). From these k packets, the original k source packets may be reconstructed (similar to block 1002 of FIG. 10). For example, to decode the sets of packets, a same or similar error correcting code that was used to encode the packets may be used to decode the packets. Block 1108 may be followed by block 1110.

At block 1110, reconstruct a file based on the decoding. In an implementation, the original k packets may be merged to result in the original file. For example, respective headers in packets of the first set of packets and respective headers in packets of the second set of packets may contain information needed to reconstruct the file. In case the original file was compressed before being divided into source packets, a decompression may be performed at block 1110 also.

Figure 12:
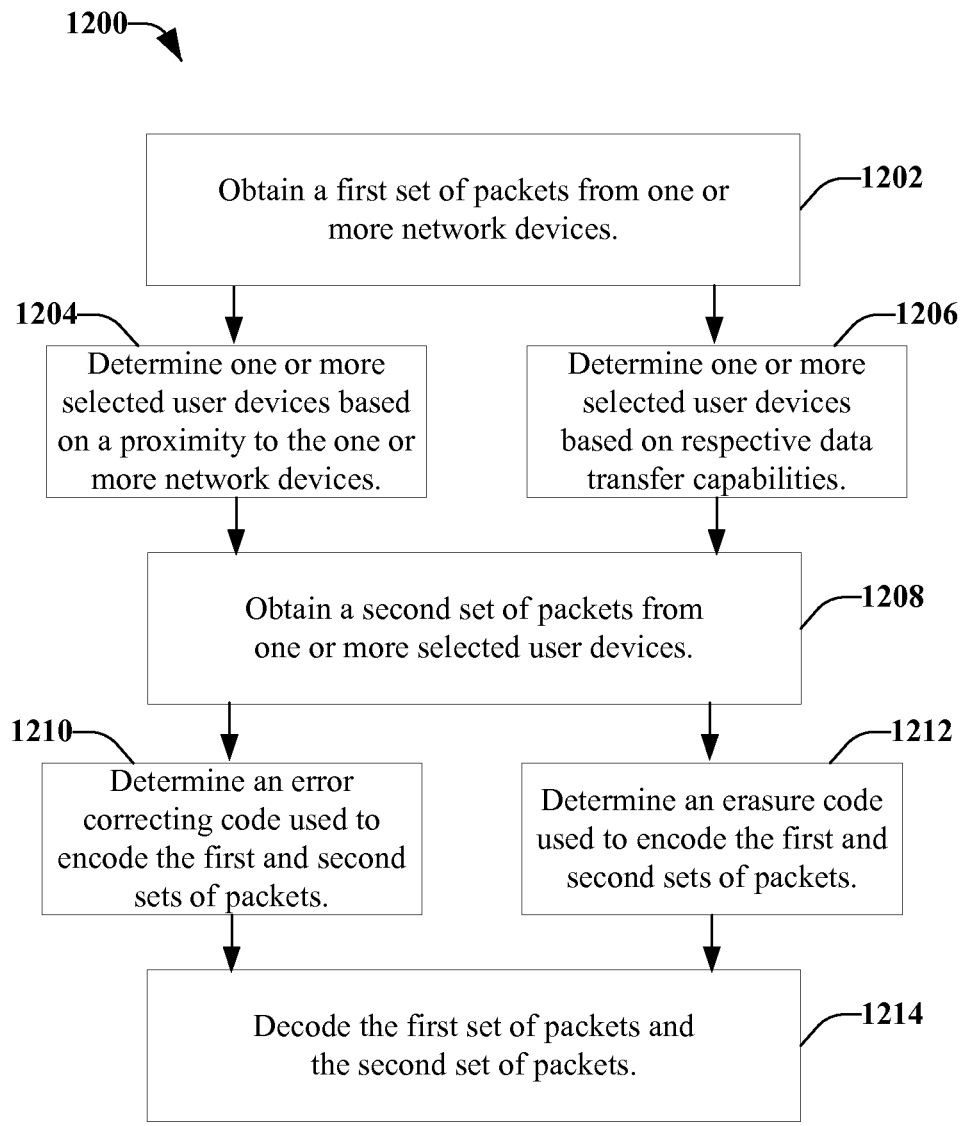
FIG. 12 illustrates an example, non-liming flow diagram for decoding a file saved in the cloud, according to an aspect.

FIG. 12 illustrates an example, non-liming flow diagram 1200 for decoding a file saved in the cloud, according to an aspect. The flow diagram 1200 in FIG. 12 may be implemented using, for example, any of the systems, such as the system 800 (of FIG. 8), described herein.

Beginning at block 1202, obtain a first set of packets from one or more network devices. Block 1202 may be followed by block 1204 or block 1206.

At block 1204, determine one or more selected user devices based on a proximity of the one or more selected user devices to the one or more network devices. Alternatively or additionally, at block 1206, determine one or more selected user devices based on respective data transfer capabilities.

Block 1204 and/or block 1206 may be followed by block 1208. At block 1208, obtain a second set of packets from the one or more selected user devices. Block 1208 may be followed by block 1210 and/or block 1212.

At block 1210, determine an error correcting code used to encode the first set of packets and the second set of packets. According to an implementation, output symbols of the first set of packets and the second set of packets do not include input symbols of the files. This may be accomplished by using a non-systematic error-correcting code. Alternatively, at block 1212, determine an erasure code used to encode the first set of packets and the second set of packets. According to an implementation, output symbols of the first set of packets and the second set of packets do not include input symbols of the files. This may be accomplished by using a non-systematic erasure code.

Block 1210 and/or block 1212 may be followed by block 1214. At block 1214, decode the first set of packets and the second set of packets based on the determined error correcting code and/or the determined erasure code. The decoding the first set of packets and the second set of packets reconstructs the original file, which may be presented to the user for viewing, manipulation, or for other functions associated with the file.

As disclosed herein, partial cloud data storage is provided. For example, a user may decide to store information (e.g., an original file) in the cloud and has a set of fixed devices and/or mobile devices (referred to herein as user device and/or user equipment) that may access the information. A file to be stored may be divided into k source packets and may be encoded into a codeword of an erasure/error-correcting code that may contain n≥k codeword symbols or encoded packets. The code may be chosen such that any k encoded packets are sufficient to recover the original file. A number of packets L<k may be stored in the cloud (e.g., one or more network devices or network nodes) and n-L packets may be stored on one or more user devices. Further, the file may not be recovered from the data stored in the cloud alone. Thus, at least k-L packets from the one or more user devices are needed to recover the file. Since n-L may be chosen to be much smaller than L, there is only a small storage requirement on the user devices. To further increase security, the parameters may be chosen such that, for example two or more user devices are needed to reconstruct the original file. According to an implementation, these two or more user devices might need to exchange their packets locally such that a form of location based access is provided.

Figure 13:
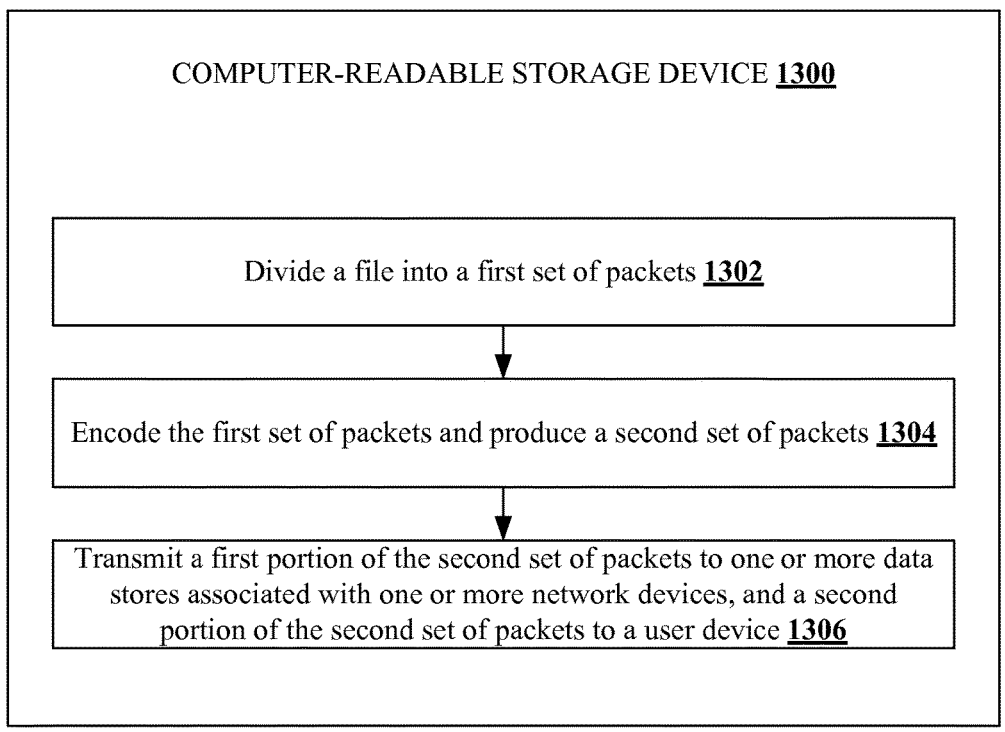
FIG. 13 illustrates a flow diagram of an example, non-limiting embodiment of a set of operations for partial cloud data storage in accordance with at least some aspects of the subject disclosure.

FIG. 13 illustrates a flow diagram of an example, non-limiting embodiment of a set of operations for partial cloud data storage in accordance with at least some aspects of the subject disclosure. A computer-readable storage device 1300 may include executable instructions that, in response to execution, cause a system comprising a processor to perform operations.

At 1302, these operations may cause the system to divide a file into a first set of packets (source packets). For example, each packet in the first set of packets may include a respective header that comprises respective information used to reassemble the file.

At 1304, the operations may cause the system to encode the first set of packets and produce a second set of packets (encoded packets). For example, a quantity of the second set of packets may be determined based on a number of data stores into which the second set of packets are to be stored.

At 1306, the operations may cause the system to transmit a first portion of the second set of packets to one or more data stores associated with one or more network devices, and a second portion of the second set of packets to a user device. The file may be reassembled using the second portion and at least a subset of the first portion.

In an implementation, the operations may cause the system to determine the user device and another user device for storage of the second portion of the second set of packets. Further to this implementation, the operations may cause the system to transmit a first subset of the second portion to the user device and a second subset of the second portion to the other user device. The user device and the other user device may be associated devices.

According to another implementation, the operations may cause the system to determine the user device based on a geographic restriction determined to be present between the user device and the one or more data stores associated with the one or more network devices.

In accordance with another implementation, the operations may cause the system to determine the user device and another user device for storage of the second portion of the second set of packets based on respective locations of the user device and the other user device during the storage of the second portion. Further to this implementation, the operations may also cause the system to transmit a first subset of the second portion to the user device and a second subset of the second portion to the other user device. The first subset and the second subset are both used to reconstruct the file.

According to an implementation, the operations may cause the system to transmit a first subset of the first portion to a first network device of the one or more network devices and a second subset of the first portion to a second network device of the one or more network devices. Further, the first network device and the second network device might be controlled by different network provider devices associated with different network service provider identities.

In accordance with another implementation, the operations may cause the system to transmit the second portion of the second set of packets to the user device that is determined to be located in a defined geographic area as the one or more network devices.

Figure 14:
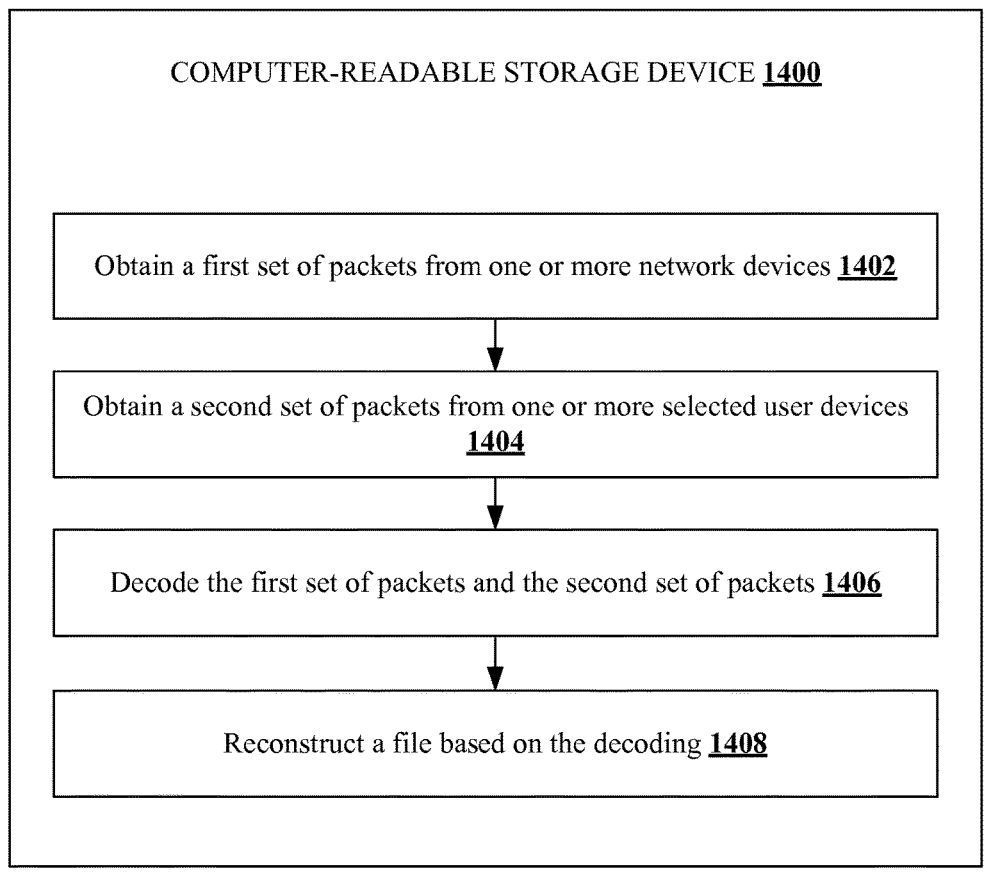
FIG. 14 illustrates a flow diagram of an example, non-limiting embodiment of a set of operations for retrieving data partially stored in one or more network devices in accordance with at least some aspects of the subject disclosure.

FIG. 14 illustrates a flow diagram of an example, non-limiting embodiment of a set of operations for retrieving data partially stored in one or more network devices in accordance with at least some aspects of the subject disclosure. A computer-readable storage device 1400 may include executable instructions that, in response to execution, cause a system comprising a processor to perform operations.

At 1402, these operations may cause the system to obtain a first set of packets from one or more network devices.

At 1404, the operations may cause the system to obtain a second set of packets from one or more selected user devices. For example, the operations may cause the system to obtain less than a total amount of the first set of packets from the one or more network devices. In one example, the operations may cause the system to determine the one or more selected user devices based on a proximity of the one or more selected user devices to the one or more network devices. In another example, the operations may cause the system to determine the one or more selected user devices based on respective data transfer capabilities or based on other parameters of the user devices.

At 1406, the operations may cause the system to generate a set of decoded packets based on the first set of packets and the second set of packets. For example, generating the set of decoded packets may be a joint decoding operation on the first and second set of packets. At 1408, the operations may cause the system to reconstruct a file based on the decoding.

For example, the operations may cause the system to determine an error correcting code used to encode the first set of packets and the second set of packets. For example, output symbols of the first set of packets and the second set of packets might not include input symbols of the file. In another example, the operations may cause the system to determine an erasure code used to encode the first set of packets and the second set of packets, and wherein output symbols of the first set of packets and the second set of packets do not include input symbols of the file.

As discussed herein, various non-limiting embodiments are directed to dividing a file (referred to as an original file) into sets of packets and generating a set of encoded packets based on these packets. A first set of encoded packets that include a small amount of data may be stored on one or more user devices. A second set of encoded packets that include a large amount of the data may be stored on one or more network devices (e.g., devices associated with one or more cloud storage providers). Since only a small amount of data may be stored at the one or more user devices, the requirements on the user side are negligible.

According to an implementation, the file may be encoded. For example, for a text file where 99.9% is stored in the cloud and 0.1% is stored on the user devices, it might be possible that the file may still be read from the data stored in the cloud even though there are some missing parts. Without encoding, the 99.9% may reveal a lot of information about the text. With encoding, no information is revealed since k packets are needed to reconstruct the original k source packets. Otherwise, there will be a huge ambiguity. For instance, when a source packet contains L bits in total and the original file has been optimally compressed to remove redundancy, a missing source packet may lead to $2^L$ different possibilities for the original file. Since L is in the order of thousands of bits (each packet may contain hundreds of bytes), the large ambiguity may make it impossible to reconstruct the original file.

Division of the packets between the user device(s) and the network device(s) may make it difficult for the data to be compromised. For example, to access the data, both the network device(s) and the user device(s) would need to be compromised. Further, according to various aspects, the attacker would also have to be physically co-located with some of the devices to gain access. Additionally or alternatively, encryption may be used to further increase security, according to an aspect.

Example Computing Environment

Figure 15:
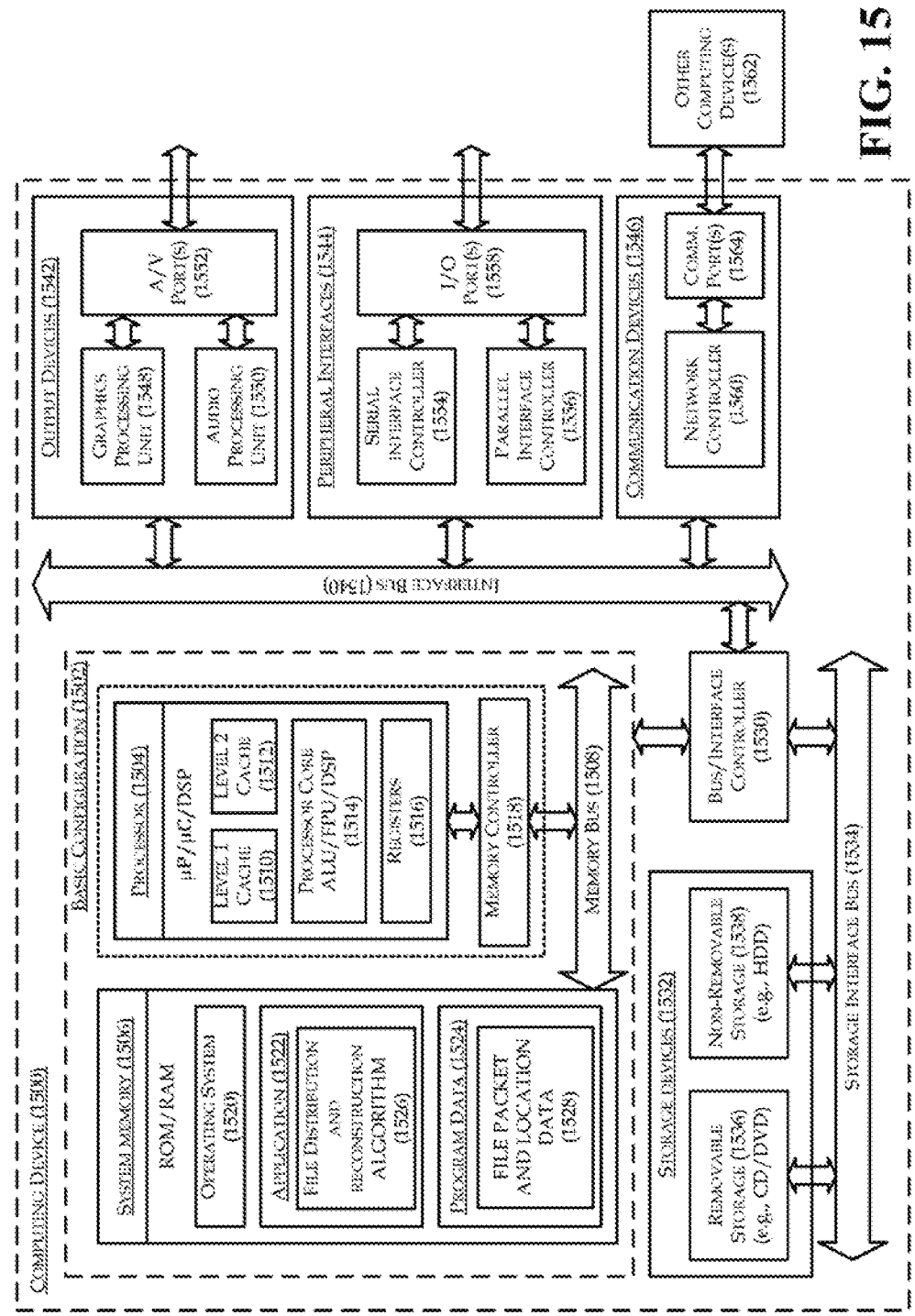
FIG. 15 is a block diagram illustrating an example computing device that is arranged for partial cloud data storage with error-correcting codes and multiple devices, arranged in accordance with at least some embodiments of the subject disclosure.

FIG. 15 is a block diagram illustrating an example computing device 1500 that is arranged for partial cloud data storage with error-correcting codes and multiple devices, arranged in accordance with at least some embodiments of the subject disclosure. In a very basic configuration 1502, the computing device 1500 typically includes one or more processors 1504 and a system memory 1506. A memory bus 1508 may be used for communicating between the processor 1504 and the system memory 1506.

Depending on the desired configuration, the processor 1504 may be of any type including but not limited to a microprocessor (µP), a microcontroller (µC), a digital signal processor (DSP), or any combination thereof. The processor 1504 may include one or more levels of caching, such as a level one cache 1510 and a level two cache 1512, a processor core 1514, and registers 1516. An example processor core 1514 may include an arithmetic logic unit (ALU), a floating point unit (FPU), a digital signal processing core (DSP Core), or any combination thereof. An example memory controller 1518 may also be used with the processor 1504, or in some implementations, the memory controller 1518 may be an internal part of the processor 1504.

In an example, the processor 1504 may execute or facilitate execution of the instructions to perform operations that include dividing a file into a set of packets responsive to an indication that the file is to be stored in a data store of a network device. The operations may also include transforming the set of source packets into a set of encoded packets by encoding the set of source packets into codeword symbols of an error correcting code. Further, the operations may include facilitating storage of a first portion of the set of encoded packets to the data store of the network device and a second portion of the set of encoded packets to one or more user devices.

According to an implementation, the operations may include dividing the file into packets comprising a same length or a similar length. If the packets are not a same or similar length, the operations may include appending a packet of the set of packets with a sequence of filler symbols.

According to another implementation, the set of packets are determined to be stored in data stores of two or more network devices. Further to this implementation, the operations may include dividing the file into more packets than a number of data stores into which the first portion is stored.

In accordance with another implementation, the operations may include facilitating storage of a first set of the second portion on a first user device and a second set of the second portion on a second user device.

According to a further implementation, the operations may include transforming the set of packets, which may include determining a quantity of packets for the set of encoded packets. The file may be reassembled from at least the second portion and at least a subset of the first portion.

In accordance with still another implementation, the operations may include facilitating storage of the second portion based on a determination that the one or more user devices are located within a defined geographic area.

According to yet another implementation, the operations may comprise including, in each header of the respective headers, a packet number and a field that indicate a number of bytes in the file.

According to still another implementation, the operations may include facilitating storage of a first set of the second portion to a first user device and a second set of the second portion to a second user device. The first user device and the second user device may be determined to be located in a defined geographic area during the storage. In addition, the first set and the second set may be both configured to be used to reassemble the file.

In accordance with still another implementation, the operations may include encoding the set of packets wherein packets of the set of packets are not included in the packets of the set of encoded packets.

Additionally or alternatively, the processor 1504 may execute or facilitate execution of the instructions to perform operations that include obtaining a first set of packets from one or more network devices and obtaining a second set of packets from one or more selected user devices. The operations may also include decoding the first set of packets and the second set of packets and reconstructing a file based on the decoding. Obtaining the second set of packets may include obtaining less than a total amount of the first set of packets from the one or more network devices.

According to an implementation, the operations may include determining the one or more selected user devices based on a proximity of the one or more selected user devices to the one or more network devices. According to another implementation, the operations may include determining the one or more selected user devices based on respective data transfer capabilities.

In accordance with another implementation, the operations may include determining an error correcting code used to encode the first set of packets and the second set of packets. Further to this implementation, output symbols of the first set of packets and the second set of packets do not include input symbols of the file.

According to another implementation, the operations may include determining an erasure code used to encode the first set of packets and the second set of packets. Further to this implementation, output symbols of the first set of packets and the second set of packets do not include input symbols of the file.

Depending on the desired configuration, the system memory 1506 may be of any type including but not limited to volatile memory (such as RAM), non-volatile memory (such as ROM, flash memory, etc.) or any combination thereof. The system memory 1506 may include an operating system 1520, one or more applications 1522, and program data 1524. The applications 1522 may include a file distribution and reconstruction algorithm 1526 that is arranged to perform the functions as described herein including those described with respect to the system 600 of FIG. 6 and/or the system 800 of FIG. 8. The program data 1524 may include file packet and location data 1528 that may be useful for operation with the file distribution and reconstruction algorithm 1526 as is described herein. In some embodiments, the applications 1522 may be arranged to operate with the program data 1524 on the operating system 1520 such that partial cloud data storage may be provided. This described basic configuration 1502 is illustrated in FIG. 15 by those components within the inner dashed line.

The computing device 1500 may have additional features or functionality, and additional interfaces to facilitate communications between the basic configuration 1502 and any required devices and interfaces. For example, a bus/interface controller 1530 may be used to facilitate communications between the basic configuration 1502 and one or more data storage devices 1532 via a storage interface bus 1534. The data storage devices 1532 may be removable storage devices 1536, non-removable storage devices 1538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 1506, the removable storage devices 1536, and the non-removable storage devices 1538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 1500. Any such computer storage media may be part of the computing device 1500.

The computing device 1500 may also include an interface bus 1540 for facilitating communication from various interface devices (e.g., output devices 1542, peripheral interfaces 1544, and communication devices 1546) to the basic configuration 1502 via a bus/interface controller 1530. Example output devices 1542 may include a graphics processing unit 1548 and an audio processing unit 1550, which may be configured to communicate to various external devices such as a display or speakers via one or more A/V ports 1552. Example peripheral interfaces 1544 may include a serial interface controller 1554 or a parallel interface controller 1556, which may be configured to communicate with external devices such as input devices (e.g., mouse, pen, voice input device, etc.) or other peripheral devices (e.g., printer, scanner, etc.) via one or more I/O ports 1558. An example communication device 1546 includes a network controller 1560, which may be arranged to facilitate communications with one or more other computing devices 1562 over a network communication link via one or more communication ports 1564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The subject disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which may, of course, vary. It is also to be understood that the terminology used herein is for the purpose of describing particular embodiments only, and is not intended to be limiting.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems; the use of hardware or software is generally (but not always, in that in certain contexts the choice between hardware and software may become significant) a design choice representing cost versus efficiency tradeoffs. There are various vehicles by which processes and/or systems and/or other technologies described herein may be effected (e.g., hardware, software, and/or firmware), and that the selected vehicle will vary with the context in which the processes and/or systems and/or other technologies are deployed. For example, if an implementer determines that speed and accuracy are paramount, the implementer may select mainly hardware and/or firmware vehicle; if flexibility is paramount, the implementer may select mainly software implementation; or, yet again alternatively, the implementer may select some combination of hardware, software, and/or firmware.

The foregoing detailed description has set forth various embodiments of the devices and/or processes via the use of block diagrams, flowcharts, and/or examples. In so far as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Further, designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiments of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve a similar functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While the various aspects have been elaborated by various figures and corresponding descriptions, features described in relation to one figure are included in the aspects as shown and described in the other figures. Merely as one example, the "packet manager" described in relation to FIG. 6 is also a feature in the aspect as shown in FIG. 3, and so forth.

From the foregoing, it will be appreciated that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:
1. A method, comprising:
  dividing, by a system comprising a processor, a file into a set of source packets in response to an indication that the file is to be stored in a data store of a network device;

transforming the set of source packets into a set of encoded packets, wherein the encoded packets comprise symbols of a single codeword of an error correcting code; and facilitating storage of the set of encoded packets by transmitting a first portion of the set of encoded packets to the data store of the network device, transmitting a second portion of the set of encoded packets to a first user device in communication with the system and the network device, and transmitting a third portion of the set of encoded packets to a second user device that is distinct from the first user device and is in communication with the system and the network device, wherein a first number of encoded packets that corresponds to the first portion transmitted to the network device is more than a second number of encoded packets that corresponds to the second portion transmitted to the first user device and the third portion transmitted to the second user device, and wherein the second portion and the third portion are at least used to decode the file.

2. The method of claim 1, wherein the dividing the file into the set of source packets comprises:
dividing the file into packets comprising a same length, and appending a packet of the set of encoded source packets with a sequence of symbols designated as a filler symbol.

3. The method of claim 1, wherein the set of encoded packets are determined to be stored in data stores of two or more network devices, and wherein the dividing the file into the set of source packets comprises:
dividing the file into more source packets than a number of data stores into which the first portion is stored.

4. The method of claim 1, wherein the first user device and the second user device comprise a display, and wherein the first user device and the second user device are associated with a corresponding user identity.

5. The method of claim 1, wherein the transforming the set of source packets comprises determining a quantity of packets for the set of encoded packets, and wherein the file is reassembled from at least the second portion and at least a subset of the first portion.

6. The method of claim 1, wherein the facilitating the storage of the second portion comprises:
facilitating the storage of the second portion based on a determination that the first user device and the second user device are located within a defined geographic area.

7. The method of claim 1, wherein packets of the set of source packets comprise respective headers that comprise respective information configured to be utilized to reassemble the file, and the dividing the file into the set of source packets comprises:
including, in each header of the respective headers, a packet number and a field that indicate a number of bytes in the file.

8. The method of claim 1, wherein the first user device and the second user device are determined to be located in a defined geographic area during the storage, and
wherein the first portion and the second portion are both configured to be used to reassemble the file.

9. The method of claim 1, wherein the transforming the set of source packets comprises:
encoding packets of the set of source packets, and wherein the packets of the set of source packets are not included in packets of the set of encoded packets.

10. A system, comprising:
a memory storing executable components; and
a processor, coupled to the memory, operable to execute or facilitate execution of one or more of the executable components, the executable components comprising:
a file manager configured to divide a file into a first set of packets and generate a block of metadata;
a packet manager configured to encode the first set of packets and produce a second set of packets, wherein a quantity of the second set of packets is determined based on a number of data stores into which the second set of packets are to be stored; and
a distribution manager configured to transmit a first portion of the second set of packets to one or more data stores associated with one or more network devices, transmit a second portion of the second set of packets to a first user device associated with a first processor that is in communication with the system and the one or more network devices, and transmit a third portion of the second set of packets to a second user device associated with a second processor that is in communication with the system and the one or more network devices, wherein the file is reassembled using the second portion and at least a subset of the first portion, and wherein the first portion associated with the one or more network devices is greater than the second portion associated with the first user device.

11. The system of claim 10, wherein the executable components further comprise a selection component configured to determine the first user device and the second user device based on a first geographic location of the first user device and a second geographic location of the second user device, and wherein the first user device and the second user device are associated devices.

12. The system of claim 10, wherein the executable components further comprise:
a selection component configured to determine the first user device based on a geographic restriction determined to be present between the first user device and the one or more data stores associated with the one or more network devices.

13. The system of claim 10, wherein the executable components further comprise a selection component configured to determine the first user device and the second user device based on respective locations of the first user device and the second user device during storage of the second portion and the third portion, and wherein the second portion and the third portion are both used to reconstruct the file.

14. The system of claim 10, wherein the distribution manager is further configured to transmit a first subset of the first portion to a first network device of the one or more network devices and a second subset of the first portion to a second network device of the one or more network devices, and
wherein the first network device and the second network device are controlled by different network provider devices associated with different network service provider identities.

15. The system of claim 10, wherein the distribution manager is further configured to transmit the second portion of the second set of packets to the first user device that is determined to be located in a defined geographic area as the one or more network devices.

16. A non-transitory computer-readable storage device comprising executable instructions that, in response to execution, cause a system comprising a processor to perform operations, comprising:

obtaining a first set of packets from one or more network devices;

obtaining a second set of packets from a first user device in communication with the system and the one or more network devices;

obtaining a third set of packets from a second user device that is different than the first user device and is in communication with the system and the one or more network devices;

generating a set of decoded packets based on the first set of packets, the second set of packets and the third set of packets; and reconstructing a file based on the generating, wherein the obtaining the second set of packets comprises obtaining the second set of packets less than a total amount of the first set of packets from the one or more network devices.

17. The non-transitory computer-readable storage device of claim 16, wherein the operations further comprise:

determining the first user device based on a proximity of the first user device to the one or more network devices.

18. The non-transitory computer-readable storage device of claim 16, wherein the operations further comprise:

determining the first user device based on data transfer capabilities of the first user device.

19. The non-transitory computer-readable storage device of claim 16, wherein the operations further comprise determining an error correcting code used to encode the first set of packets, the second set of packets, and the third set of packets, and wherein output symbols of the first set of packets, the second set of packets, and the third set of packets do not include input symbols of the file.

20. The non-transitory computer-readable storage device of claim 16, wherein the operations further comprise determining an erasure code used to encode the first set of packets, the second set of packets, and the third set of packets, and wherein output symbols of the first set of packets, the second set of packets, and the third set of packets do not include input symbols of the file.

* * * * *

UNITED STATES PATENT AND TRADEMARK OFFICE
CERTIFICATE OF CORRECTION

| | | |
|---|---|---|
| PATENT NO. | : 9,710,330 B2 | Page 1 of 1 |
| APPLICATION NO. | : 14/515214 | |
| DATED | : July 18, 2017 | |
| INVENTOR(S) | : Cronie | |

It is certified that error appears in the above-identified patent and that said Letters Patent is hereby corrected as shown below:

In the Specification

In Column 9, Line 22, delete "cloud there" and insert -- cloud, there --, therefor.

In Column 19, Line 14, delete "him In" and insert -- him. In --, therefor.

In the Claims

In Column 33, Line 67, in Claim 10, delete "storing executable" and insert -- storing computer-executable --, therefor.

In Column 34, Line 2, in Claim 10, delete "the executable" and insert -- the computer-executable --, therefor.

In Column 34, Line 3, in Claim 10, delete "the executable" and insert -- the computer-executable --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*